US012372797B2

(12) United States Patent
Yu et al.

(10) Patent No.: US 12,372,797 B2
(45) Date of Patent: Jul. 29, 2025

(54) LIQUID CRYSTAL POLARIZATION HOLOGRAM (LCPH) BASED EYE TRACKING FOR AR/VR

(71) Applicant: Meta Platforms Technologies, LLC, Menlo Park, CA (US)

(72) Inventors: Hao Yu, Kent, OH (US); Qing Chao, Redmond, WA (US); Lu Lu, Kirkland, WA (US); Xinqiao Liu, Medina, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 869 days.

(21) Appl. No.: 17/553,739

(22) Filed: Dec. 16, 2021

(65) Prior Publication Data
US 2023/0194882 A1   Jun. 22, 2023

(51) Int. Cl.
   *G02B 27/01*   (2006.01)
   *G02B 6/34*    (2006.01)
   *G02B 27/28*   (2006.01)
   *G03H 1/02*    (2006.01)
   *G06F 3/01*    (2006.01)

(52) U.S. Cl.
   CPC ......... *G02B 27/0179* (2013.01); *G02B 6/34* (2013.01); *G02B 27/0172* (2013.01); *G02B 27/286* (2013.01); *G03H 1/0248* (2013.01); *G06F 3/013* (2013.01); *G02B 2027/0174* (2013.01); *G02B 2027/0178* (2013.01); *G02B 2027/0187* (2013.01)

(58) Field of Classification Search
   CPC .. G02B 27/0179; G02B 6/34; G02B 27/0172; G02B 27/286; G02B 2027/0174; G02B 2027/0178; G02B 2027/0187; G03H 1/0248; G06F 3/013
   See application file for complete search history.

(56) References Cited

U.S. PATENT DOCUMENTS

| | | | |
|---|---|---|---|
| 2019/0086674 A1 | 3/2019 | Sinay et al. | |
| 2019/0353898 A1 | 11/2019 | Amirsolaimani et al. | |
| 2020/0201034 A1 | 6/2020 | Geng et al. | |
| 2021/0072448 A1 | 3/2021 | Peng et al. | |

OTHER PUBLICATIONS

International Search Report and Written Opinion for International Application No. PCT/US2022/052480, mailed Jun. 14, 2023, 15 pages.
Invitation to Pay Additional Fees for International Application No. PCT/US2022/052480, mailed Apr. 18, 2023, 9 pages.

*Primary Examiner* — Wen Huang
(74) *Attorney, Agent, or Firm* — McDermott Will & Emery LLP

(57) ABSTRACT

An eye-tracking system includes a substrate transparent to visible light and configured to be placed in a field of view of an eye of a user, a plurality of waveguides on the substrate, a light source optically coupled to the plurality of waveguides, and a plurality of polarization volume holograms (PVHs) in the field of view of the eye of the user. Each PVH of the plurality of PVHs is optically coupled to a respective waveguide of the plurality of waveguides and is configured to couple a respective light beam out of the respective waveguide towards the eye of the user.

16 Claims, 22 Drawing Sheets

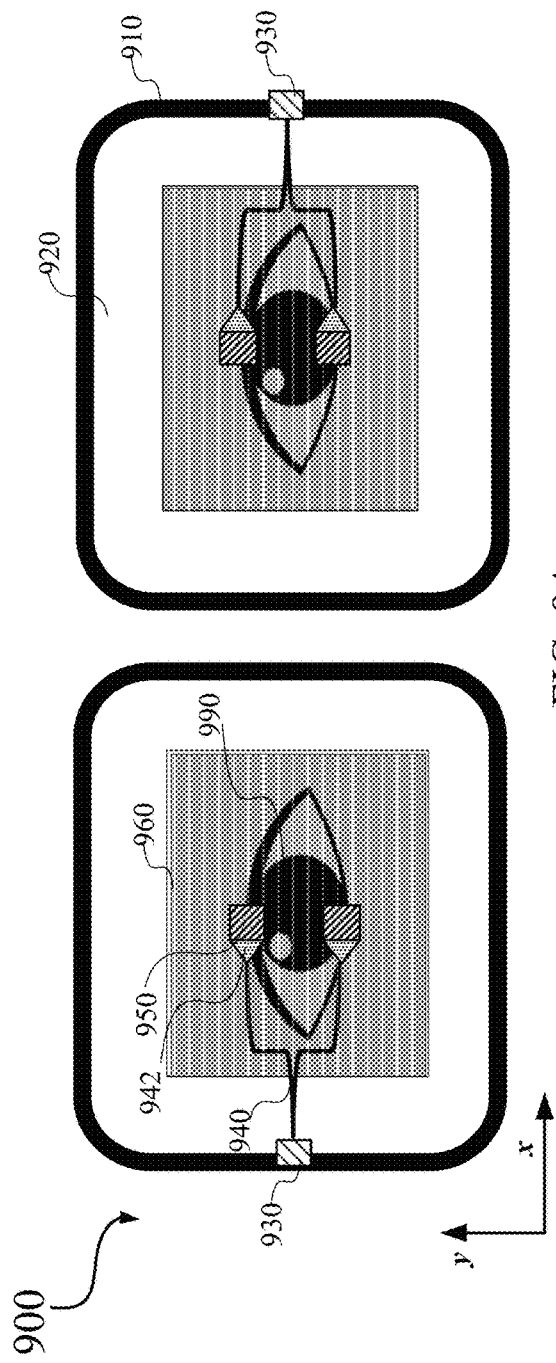
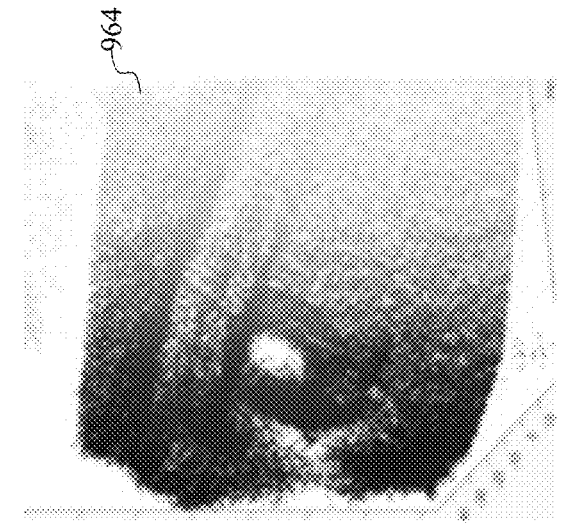
FIG. 9A
FIG. 9B
FIG. 9C

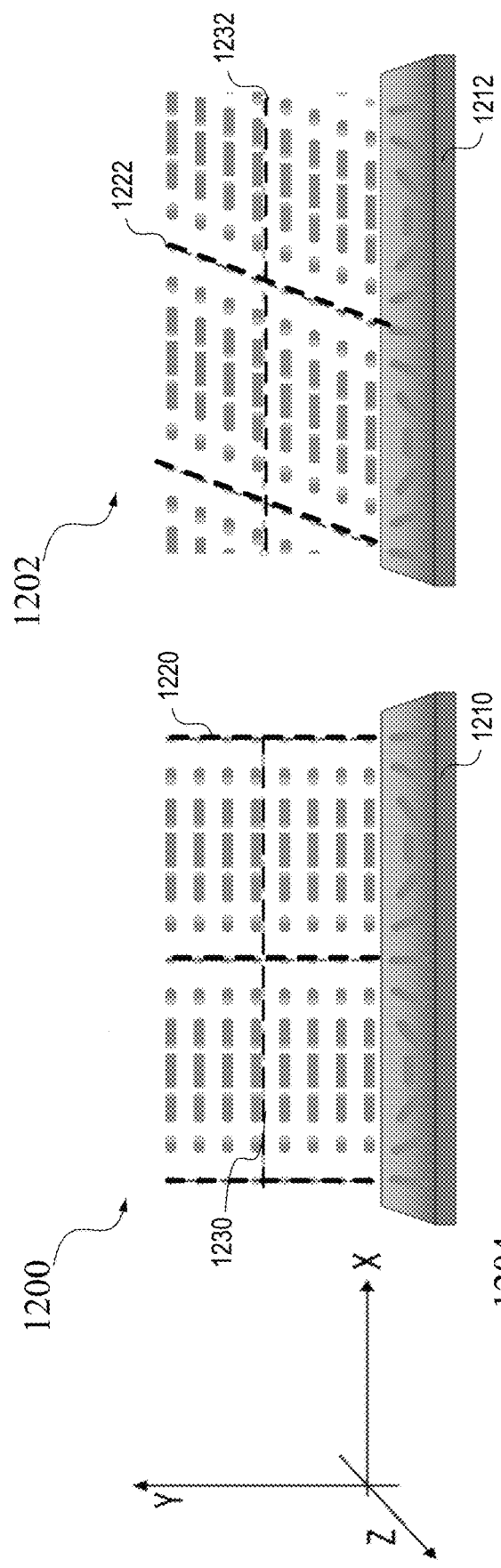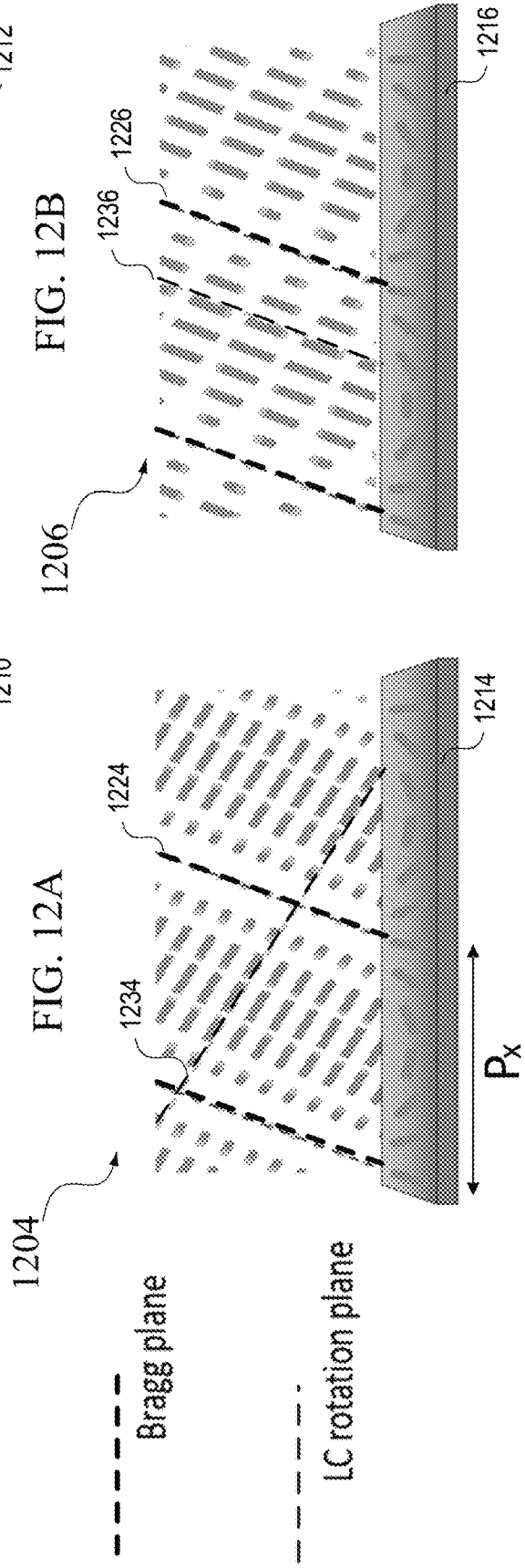
FIG. 12A  FIG. 12B  FIG. 12C  FIG. 12D

LIQUID CRYSTAL POLARIZATION HOLOGRAM (LCPH) BASED EYE TRACKING FOR AR/VR

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

To provide a more immersive artificial reality experience, some artificial reality systems may include an input device for receiving user inputs, such as hand and/or finger movements. Additionally or alternatively, artificial reality systems can employ tracking systems, such as eye-tracking systems that can track the user's eye (e.g., gaze direction). The artificial reality systems may use the gaze direction information and/or information gained from the input device to modify or generate content based on the direction in which the user is looking, thereby providing a more immersive experience for the user. Eye-tracking systems can also be used for foveated rendering, foveated compression and transmission of image data, alertness monitoring, and the like.

SUMMARY

This disclosure relates generally to eye-tracking in near-eye display systems. According to certain embodiments, an eye-tracking system may include a substrate transparent to visible light and configured to be placed in a field of view of an eye of a user, a plurality of waveguides on the substrate, a light source optically coupled to the plurality of waveguides, and a plurality of polarization volume holograms (PVHs) in the field of view of the eye of the user. Each PVH of the plurality of PVHs may be optically coupled to a respective waveguide of the plurality of waveguides and may be configured to couple a respective light beam out of the respective waveguide towards the eye of the user. In some embodiments, the eye-tracking system may also include a polarization converter (e.g., a quarter-wave plate) or a filter between each PVH of the plurality of PVHs and the respective waveguide of the plurality of waveguides, where the polarization converter may be configured to convert linearly polarized light into circularly polarized light or convert circularly polarized light into linearly polarized light. In some embodiments, the PVH may diffract a right-handed circularly polarized beam into a left-handed circularly polarized beam and may diffract a left-handed circularly polarized beam into a right-handed circularly polarized beam, but may diffract a linear polarized beam into a right-handed circularly polarized beam and a left-handed circularly polarized beam.

In some embodiments of the eye-tracking system, the light source may be configured to emit coherent light, the plurality of waveguides may include single-mode waveguides, and a first pair of PVHs of the plurality of PVHs may be configured to couple a first pair of light beams out of a first pair of waveguides of the plurality of waveguides, where the first pair of light beams may interfere at the eye of the user and form a first set of fringes on the eye of the user. In some embodiments, a second pair of PVHs of the plurality of PVHs may be configured to couple a second pair of light beams out of a second pair of waveguides of the plurality of waveguides, where the second pair of light beams may interfere at the eye of the user and form a second set of fringes on the eye of the user, and the first set of fringes and the second set of fringes may have different orientations, different periods, or both. In some embodiments, each PVH of the first pair of PVHs may characterized by two or more different grating periods or a varying grating period (e.g., a chirped grating). In some embodiments, the eye-tracking system may include a second plurality of waveguides on the substrate, a second light source optically coupled to the second plurality of waveguides and configured to emit coherent light, and a second plurality of PVHs in the field of view of the eye of the user. Each PVH of the second plurality of PVHs may be optically coupled to a respective waveguide of the second plurality of waveguides and may be configured to couple a respective light beam out of the respective waveguide of the second plurality of waveguides towards the eye of the user. A second pair of PVHs of the second plurality of PVHs may be configured to couple a second pair of light beams out of a pair of waveguides of the second plurality of waveguides. The second pair of light beams may interfere at the eye of the user and form a second set of fringes on the eye of the user, where the first set of fringes and the second set of fringes may have different orientations, different periods, or both.

In some embodiments of the eye-tracking system, the light source may be configured to emit coherent or noncoherent light, and each light beam coupled out of the respective waveguide of the plurality of waveguides may form a glint on a respective region of the eye of the user. In some embodiments, each PVH of the plurality of PVHs may be characterized by a uniform grating period. In some embodiments, light beams coupled out of the plurality of waveguides by the plurality of PVHs may form a two-dimensional pattern of glints on the eye of the user.

In some embodiments, each PVH of the plurality of PVHs may include a layer of a birefringent material including helical structures formed by molecules of the birefringent material that are oriented according to a periodical pattern. A rotation plane of the molecules of the birefringent material may be slanted with respect to the substrate. The helical structures may form a Bragg grating, and wherein a Bragg plane of the Bragg grating is slanted with respect to the substrate. In some embodiments, each PVH of the plurality of PVHs may include a transmissive PVH on the respective waveguide of the plurality of waveguides and between the respective waveguide and the eye of the user, or a reflective PVH below the respective waveguide of the plurality of waveguides, where the respective waveguide is between the reflective PVH and the eye of the user.

In some embodiments, each waveguide of the plurality of waveguides may include an end section having a width greater than a width of other sections of the waveguide, and each PVH of the plurality of PVH may be on the end section of the respective waveguide of the plurality of waveguides. In some embodiments, each waveguide of the plurality of waveguides may include a tapered section between the end section and other sections of the waveguide. In some embodiments, a light beam coupled out of a waveguide of the plurality of waveguides by a PVH of the plurality of PVHs may propagate at an angle greater than 30° with respect to a surface-normal direction of the substrate. In some embodiments, the eye-tracking system may include one or more camera configured to capture images of the eye of the user from one or more perspectives.

According to some embodiments, an optical device may include a substrate, a waveguide on the substrate, a polarization volume hologram (PVH) on a first section of the waveguide, and a polarization converter between the PVH and the first section of the waveguide. The waveguide may include a first cladding layer, a core layer on the first cladding layer, and a second cladding layer on the core layer, where the second cladding layer may be removed at the first section of the waveguide. The PVH may be configured to couple light out of the waveguide or couple light into the waveguide, where the PVH may include a layer of a birefringent material including helical structures formed by molecules of the birefringent material that are oriented according to a periodical pattern. The polarization converter may be configured to convert linearly polarized light into circularly polarized light or convert circularly polarized light into linearly polarized light. In some embodiments, the PVH may diffract a right-handed circularly polarized beam into a left-handed circularly polarized beam and may diffract a left-handed circularly polarized beam into a right-handed circularly polarized beam, but may diffract a linear polarized beam into a right-handed circularly polarized beam and a left-handed circularly polarized beam. In some embodiments, the helical structures may form a Bragg grating, where a Bragg plane of the Bragg grating is slanted with respect to the core layer of the waveguide.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 9A illustrates an example of a near-eye display including an eye-tracking system that uses an interferometric fringe illumination pattern generated using polarization volume hologram (PVH) for three-dimensional (3D) eye tracking according to certain embodiments.

FIG. 9B illustrates an example of a two-dimensional (2D) image of a user's eye illuminated by an interferometric fringe illumination pattern according to certain embodiments.

FIG. 9C illustrates an example of a 3D profile of a user's eye reconstructed from 2D images of the user's eye illuminated by an interferometric fringe illumination pattern according to certain embodiments.

FIG. 12A illustrates an example of a primary transmissive polarization volume hologram.

FIG. 12B illustrates an example of a twisted transmissive polarization volume hologram.

FIG. 12C illustrates an example of a slanted transmissive polarization volume hologram.

FIG. 12D illustrates an example of a tilted polarization volume hologram.

Figure 1:
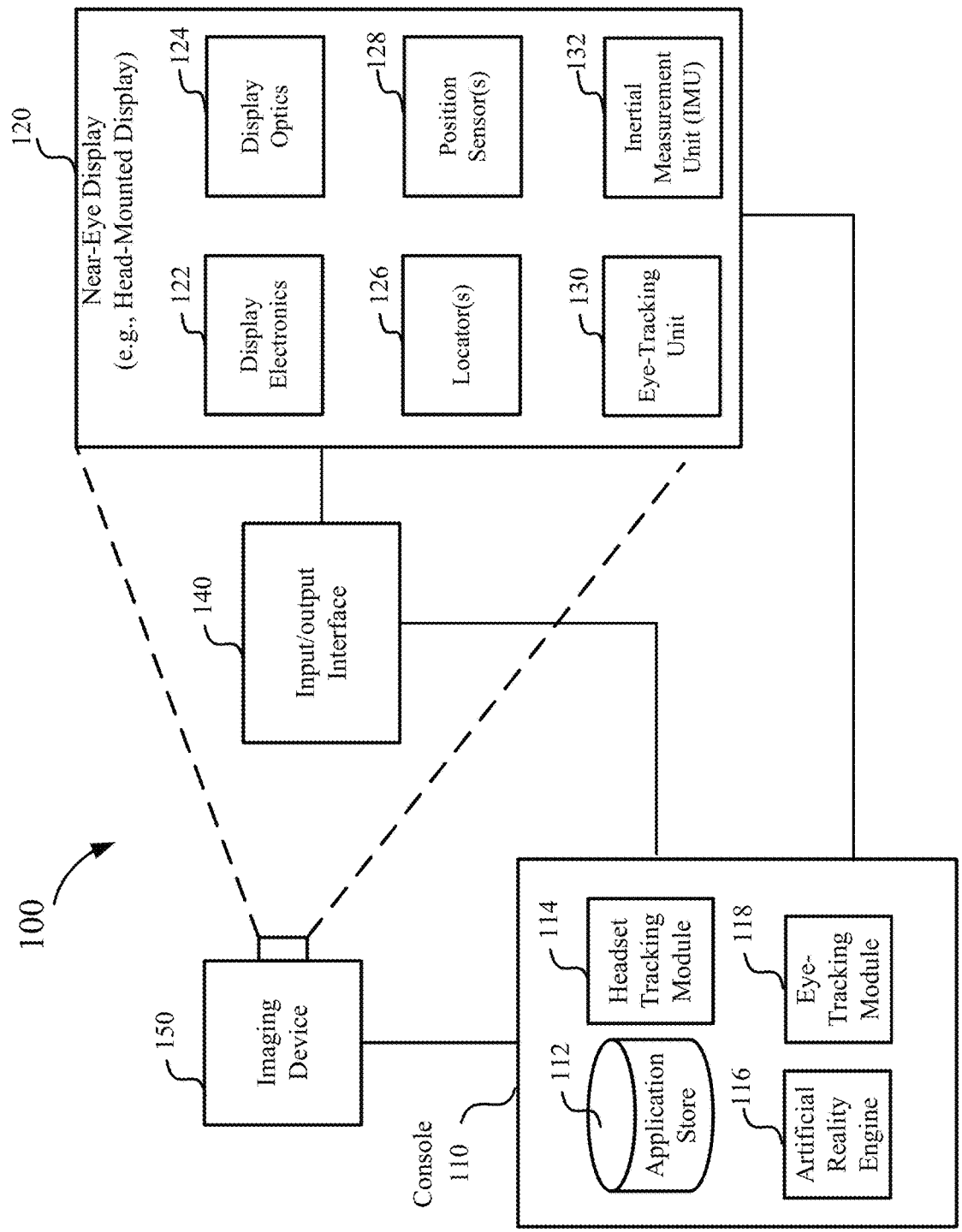
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to artificial reality systems, and more specifically, to an eye-tracking subsystem in an artificial reality system. The eye-tracking subsystem may include waveguides and polarization volume holograms placed in the field of view of a user of the artificial reality system and configured to generate interferometric fringe patterns or glints on the user's eyes for eye tracking. Various inventive embodiments are described herein, including systems, modules, devices, components, methods, and the like.

In an artificial reality system, such as a virtual reality (VR), augmented reality (AR), or mixed reality (MR) system, an eye-tracking system may be used to track the user's eye in order to modify or generate content based on a location or a direction in which the user is looking, thereby improving user interaction with presented content. Tracking the eye may include, for example, tracking the position and/or shape of the pupil and/or the cornea of the eye, and determining the rotational position or gaze direction of the eye. The eye-tracking system of the artificial reality system may include an illumination subsystem that can illuminate the user's eye using light sources mounted to or inside the artificial reality system. The eye-tracking system may also include an imaging subsystem that includes one or more imaging devices (e.g., cameras) for capturing light reflected by various surfaces of the user's eye. Light that is diffusively reflected (e.g., scattered) by, for example, the iris of the user's eye, may affect the contrast of the captured image in the iris or pupil region, which may be used to determine the edges of the iris or pupil and the center of the pupil. Light reflected specularly off the cornea of the user's eye may result in "glints" in the captured image. The glints may also be referred to as the first Purkinje images or corneal reflections. Techniques such as centroiding algorithms may be used to determine the locations of the glints on the eye in the captured image. For example, the centroiding algorithm may determine the center of the glint by finding the pixel location with the most energy in a local neighborhood. The rotational position (e.g., the gaze direction) of the eye may then be determined based on the locations of the glints relative to a known feature of the eye (e.g., the center of the pupil) within the captured image.

In some illumination subsystems, one or more light sources (e.g., LEDs or lasers) may be positioned at the periphery of the user's field of view (e.g., along the circumference of the viewing optics or on a frame of the near-eye display system) to provide light for illuminating the user's eye. In some imaging subsystems, one or more imaging devices (e.g., cameras) may be placed at the periphery of the user's field of view. In many applications, the viewing direction (e.g., gazing angle) may need to be determined with a high accuracy, such as less than 5°, less than 1°, or better. The eye-tracking system may also need to be robust in order to accommodate for extreme changes in the viewing direction and variations in facial features surrounding the user's eyes, such as cases where portions of the eye, including portions of the iris or the pupil, may be obscured by, for example, eyelids or eye lashes. Obscurations may occur when, for example, the user looks in a downward direction or when the user rapidly re-acquires the viewing direction after the eyelids reopen during eye blinks.

In-field illumination may offer greater eye-tracking accuracy than positioning the light sources at the periphery of the user's field of view. For example, the probability of capturing glints off the cornea over all gaze angles of the eye is higher when the light sources are located within the field of view of the user. Further, positioning the light sources within the user's field of view may offer greater flexibility in the placement and distribution of the light sources, such that the amount of light captured by the camera is maximized and thus the intensity of the output light from the light sources and the power consumption of the light sources can be reduced. However, in-field illumination may have several challenges. For example, the light sources (e.g., LEDs) in the field of view of the user may affect the see-through quality of the real world images and the displayed images, and may increase the cost and power consumption of the eye-tracking system.

The glint tracking technique may be able to achieve an accuracy on the order of about one degree after calibration. But such accuracy may be difficult to achieve across the wide variety of human eye shapes and sizes. In addition, three-dimensional (3D) data (e.g., depth information) obtained from glint tracking is generally sparse because only a small number of infrared (IR) point sources may be used to illuminate specific locations on the surface of the eye, and thus only a small number of depth points may be measured. Because only a few points on the surface of the eye may be sampled by the glints, the depth computation may often use an idealized model of the human eye that may not be valid for all users. In addition, for AR devices (e.g., waveguide-based optical see-through AR devices) in which the display is transparent and the device is expected to undergo all-day, untethered use in a stylish form factor, there may be more constraints on the mechanical layout of the light sources and imaging devices, as well as the size, weight, and power consumption of the AR devices. Furthermore, for AR devices operating outdoors, reflections of the real world environment may result in glint-like reflections that may be confusing to or misinterpreted by the eye-tracking algorithms.

According to certain embodiments disclosed herein, an eye-tracking system of a near-eye display may include a substrate configured to be placed in a field of view of an eye of a user of the near-eye display, one or more light sources outside of the field of view of the eye of the user and configured to emit illumination light (e.g., IR light, such as near-infrared (NIR) light), a plurality of waveguides formed in or on the substrate and configured to guide the illumination light emitted by the one or more light sources, and a plurality of polarization volume holograms (PVHs, which may also be referred to as polarization volume gratings (PVGs) or Bragg polarization gratings (BPGs)) configured to diffract the illumination light guided by the plurality of waveguides into light beams that propagate towards the eye of the user. The waveguides and PVHs may be transparent to visible light, and thus may be placed in the field of view of the eye of the user. Light beams diffracted by the plurality of PVHs can have large solid angles and thus may overlap and interfere at the eye of the user to form interferometric patterns on the eye of the user. Alternatively, light beams diffracted by the plurality of PVHs may be narrow beams (pencil beams) that may not overlap with each other at the user's eye but may form glints on the user's eye. One or more cameras may collect light reflected from the user's eye to capture images of the user's eye that has the interferometric fringe patterns or glints on it. The captured images may then be analyzed or otherwise processed by, for example, an image processor or a neural network processor, to determine or infer a position of the user's eye.

In one example, the light source may be a coherent light source, the waveguides may be single-mode waveguides, and a pair of light beams diffracted by a pair of PVHs may overlap and interfere at the user's eye to produce a light pattern in the form of a sinusoidal interference pattern (referred to herein as an interferometric fringe pattern or a structured light pattern). Accordingly, rather than projecting a constellation of a small number of glints that sparsely sample the surface of the eye, the PVHs may project an interferometric fringe pattern (e.g., parallel or crossed fringes) onto the surface of the eye, thereby densely sampling the eye's surface. Due to the three-dimensional profile of the user's eye, two-dimensional (2D) images of the user's eye captured by the camera(s) may include distorted interferometric fringe pattern. Based on information in the images captured by camera(s), such as the distortion of the interferometric fringe pattern by the user's eye, a 3D image or depth image of the surface of the user's eye can be computed. For example, a depth profile of the eye's surface may be created at video frame rates by using, for example, triangulation with depth sensing. The eye's position and gaze direction may be determined, for example, using the 3D images. The image content displayed on a display panel may then be adjusted accordingly based on the eye's position or the gaze direction and/or gaze point of the user.

In another example, the light source may not need to be a coherent light source, and the eye-tracking system may include a large number of waveguides and PVHs to generate a large number of light beams. The light beams diffracted by the PVHs may be narrow beams and may not overlap and interfere at the user's eye, but may form a two-dimensional pattern of glints on the user's eye.

The PVHs disclosed herein may be placed in the field of view of the user's eye, and may diffract the illumination light at a high diffraction efficiency. Thus, a highly efficient in-field illumination may be achieved. In addition, the PVHs may be able to generate diffracted light beams having large solid angles such that the diffracted light beams may interfere in a large overlapped region to form a large interferometric fringe pattern. One pair of PVHs may be used to generate one set of fringes. Multiple sets of fringes with different orientations and/or periods may be generated using multiple pairs of PVHs. The PVHs may be much easier to fabricate than some other types of grating couplers, such as etched grating couplers. Therefore, the use of the interferometric fringe pattern or glint pattern generated using in-field PVHs can result in a densely sampled and more accurate depth profile of the eye, and thus can provide for an integrated eye-tracking system that is accurate, power efficient, and cost effective.

As used herein, visible light may refer to light with a wavelength between about 380 nm and about 750 nm, between about 400 nm and about 700 nm, or between about 440 nm and about 650 nm. Near infrared (NIR) light may refer to light with a wavelength between about 750 nm to about 2500 nm. The desired infrared (IR) wavelength range may refer to the wavelength range of IR light that can be detected by a suitable IR sensor (e.g., a complementary metal-oxide semiconductor (CMOS), a charge-coupled device (CCD) sensor, or an InGaAs sensor), such as between 830 nm and 860 nm, between 930 nm and 980 nm, or between about 750 nm to about 1000 nm.

As also used herein, a substrate may refer to a medium within which light may propagate. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to about 10 mm or more. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material. The transmission rate (i.e., transmissivity) may be represented by either a photopically weighted or unweighted average transmission rate over a range of wavelengths, or the lowest transmission rate over a range of wavelengths, such as the visible wavelength range.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display system 120 in accordance with certain embodiments. Artificial reality system environment 100 shown in FIG. 1 may include near-eye display system 120, an optional imaging device 150, and an optional input/output interface 140 that may each be coupled to an optional console 110. While FIG. 1 shows example artificial reality system environment 100 including one near-eye display system 120, one imaging device 150, and one input/output interface 140, any number of these components may be included in artificial reality system environment 100, or any of the components may be omitted. For example, there may be multiple near-eye display systems 120 monitored by one or more external imaging devices 150 in communication with console 110. In some configurations, artificial reality system environment 100 may not include imaging device 150, optional input/output interface 140, and optional console 110. In alternative configurations, different or additional components may be included in artificial reality system environment 100. In some configurations, near-eye display systems 120 may include imaging device 150, which may be used to track one or more input/output devices (e.g., input/output interface 140), such as a handheld controller.

Near-eye display system 120 may be a head-mounted display that presents content to a user. Examples of content presented by near-eye display system 120 include one or more of images, videos, audios, or some combination thereof. In some embodiments, audios may be presented via an external device (e.g., speakers and/or headphones) that receives audio information from near-eye display system 120, console 110, or both, and presents audio data based on the audio information. Near-eye display system 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display system 120 may be implemented in any suitable form factor, including a pair of glasses. Some embodiments of near-eye display system 120 are further described below. Additionally, in various embodiments, the functionality described herein may be used in a headset that combines images of an environment external to near-eye display system 120 and artificial reality content (e.g., computer-generated images). Therefore, near-eye display system 120 may augment images of a physical, real-world environment external to near-eye display system 120 with generated content (e.g., images, video, sound, etc.) to present an augmented reality to a user.

In various embodiments, near-eye display system 120 may include one or more of display electronics 122, display optics 124, and an eye-tracking system 130. In some embodiments, near-eye display system 120 may also include one or more locators 126, one or more position sensors 128, and an inertial measurement unit (IMU) 132. Near-eye display system 120 may omit any of these elements or include additional elements in various embodiments. Additionally, in some embodiments, near-eye display system 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMO-LED), a transparent OLED display (TOLED), or some other display. For example, in one implementation of near-eye display system 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), magnify image light received from display electronics 122, correct optical errors associated with the image light, and present the corrected image light to a user of near-eye display system 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display system 120.

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions.

Example types of three-dimensional errors may include spherical aberration, comatic aberration, field curvature, and astigmatism.

Locators 126 may be objects located in specific positions on near-eye display system 120 relative to one another and relative to a reference point on near-eye display system 120. In some implementations, console 110 may identify locators 126 in images captured by imaging device 150 to determine the artificial reality headset's position, orientation, or both. A locator 126 may be a light emitting diode (LED), a corner cube reflector, a reflective marker, a type of light source that contrasts with an environment in which near-eye display system 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

Imaging device 150 may be part of near-eye display system 120 or may be external to near-eye display system 120. Imaging device 150 may generate slow calibration data based on calibration parameters received from console 110. Slow calibration data may include one or more images showing observed positions of locators 126 that are detectable by imaging device 150. Imaging device 150 may include one or more cameras, one or more video cameras, any other device capable of capturing images including one or more of locators 126, or some combinations thereof. Additionally, imaging device 150 may include one or more filters (e.g., to increase signal to noise ratio). Imaging device 150 may be configured to detect light emitted or reflected from locators 126 in a field of view of imaging device 150. In embodiments where locators 126 include passive elements (e.g., retroreflectors), imaging device 150 may include a light source that illuminates some or all of locators 126, which may retro-reflect the light to the light source in imaging device 150. Slow calibration data may be communicated from imaging device 150 to console 110, and imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display system 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display system 120 relative to an initial position of near-eye display system 120. For example, IMU 132 may integrate measurement signals received from accelerometers over time to estimate a velocity vector and integrate the velocity vector over time to determine an estimated position of a reference point on near-eye display system 120. Alternatively, IMU 132 may provide the sampled measurement signals to console 110, which may determine the fast calibration data. While the reference point may generally be defined as a point in space, in various embodiments, the reference point may also be defined as a point within near-eye display system 120 (e.g., a center of IMU 132).

Eye-tracking system 130 may include one or more eye-tracking systems. Eye-tracking may refer to determining an eye's position, including orientation and location of the eye, relative to near-eye display system 120. An eye-tracking system may include an imaging system to image one or more eyes and may generally include a light emitter, which may generate light that is directed to an eye such that light reflected by the eye may be captured by the imaging system. For example, eye-tracking system 130 may include a non-coherent or coherent light source (e.g., a laser diode) emitting light in the visible spectrum or infrared spectrum, and a camera capturing the light reflected by the user's eye. As another example, eye-tracking system 130 may capture reflected radio waves emitted by a miniature radar unit. Eye-tracking system 130 may use low-power light emitters that emit light at frequencies and intensities that would not injure the eye or cause physical discomfort. Eye-tracking system 130 may be arranged to increase contrast in images of an eye captured by eye-tracking system 130 while reducing the overall power consumed by eye-tracking system 130 (e.g., reducing power consumed by a light emitter and an imaging system included in eye-tracking system 130). For example, in some implementations, eye-tracking system 130 may consume less than 100 milliwatts of power.

In some embodiments, eye-tracking system 130 may include one light emitter and one camera to track each of the user's eyes. Eye-tracking system 130 may also include different eye-tracking systems that operate together to provide improved eye-tracking accuracy and responsiveness. For example, eye-tracking system 130 may include a fast eye-tracking system with a fast response time and a slow eye-tracking system with a slower response time. The fast eye-tracking system may frequently measure an eye to capture data used by an eye-tracking module 118 to determine the eye's position relative to a reference eye position. The slow eye-tracking system may independently measure the eye to capture data used by eye-tracking module 118 to determine the reference eye position without reference to a previously determined eye position. Data captured by the slow eye-tracking system may allow eye-tracking module 118 to determine the reference eye position with greater accuracy than the eye's position determined from data captured by the fast eye-tracking system. In various embodiments, the slow eye-tracking system may provide eye-tracking data to eye-tracking module 118 at a lower frequency than the fast eye-tracking system. For example, the slow eye-tracking system may operate less frequently or have a slower response time to conserve power.

Eye-tracking system 130 may be configured to estimate the orientation of the user's eye. The orientation of the eye may correspond to the direction of the user's gaze within near-eye display system 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about ±4° vertically (which may be referred to as kappa angles, which may vary from person to person). Because the foveal axis is defined according to the fovea, which is located in the back of the eye, the foveal axis may be difficult or impossible to measure directly in some eye-tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking system 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking system, due to, for example, a shift in the position of near-eye display system 120 on a user's head, may also be detected. Eye-tracking system 130 may also detect the torsion of the eye and the rotation of the eye about the pupillary axis. Eye-tracking system 130 may use the detected torsion of the eye to estimate the orientation of the foveal axis from the pupillary axis. In some embodiments, eye-tracking system 130 may also track a change in the shape of the eye, which may be approximated as a skew or scaling linear transformation or a twisting distortion (e.g., due to torsional deformation). In some embodiments, eye-tracking system 130 may estimate the foveal axis based on some combinations of the angular orientation of the pupillary axis, the translation of the eye, the torsion of the eye, and the current shape of the eye.

In some embodiments, eye-tracking system 130 may include multiple emitters or at least one emitter that can project a structured light pattern on all portions or a portion of the eye. The structured light pattern may be distorted due to the shape of the eye when viewed from an offset angle. Eye-tracking system 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking system 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking system 130 can also estimate the pupillary axis, the translation of the eye, the torsion of the eye, and the current shape of the eye based on the image of the distorted structured light pattern captured by the camera.

Near-eye display system 120 may use the orientation of the eye to, e.g., determine an inter-pupillary distance (IPD) of the user, determine gaze directions, introduce depth cues (e.g., blur image outside of the user's main line of sight), collect heuristics on the user interaction in the VR media (e.g., time spent on any particular subject, object, or frame as a function of exposed stimuli), perform some other functions that are based in part on the orientation of at least one of the user's eyes, or some combination thereof. Because the orientation may be determined for both eyes of the user, eye-tracking system 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, imaging device 150 may be used to track input/output interface 140, such as tracking the location or position of a controller (which may include, for example, an IR light source) or a hand of the user to determine the motion of the user. In some embodiments, near-eye display 120 may include one or more imaging devices (e.g., imaging device 150) to track input/output interface 140, such as tracking the location or position of a controller or a hand of the user to determine the motion of the user.

Console 110 may provide content to near-eye display system 120 for presentation to the user in accordance with information received from one or more of imaging device 150, near-eye display system 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback applications, or other suitable applications.

Headset tracking module 114 may track movements of near-eye display system 120 using slow calibration information from imaging device 150. For example, headset tracking module 114 may determine positions of a reference point of near-eye display system 120 using observed locators from the slow calibration information and a model of near-eye display system 120. Headset tracking module 114 may also determine positions of a reference point of near-eye display system 120 using position information from the fast calibration information. Additionally, in some embodiments, headset tracking module 114 may use portions of the fast calibration information, the slow calibration information, or some combination thereof, to predict a future location of near-eye display system 120. Headset tracking module 114 may provide the estimated or predicted future position of near-eye display system 120 to artificial reality engine 116.

Headset tracking module 114 may calibrate the artificial reality system environment 100, using one or more calibration parameters, and may adjust one or more calibration parameters to reduce errors in determining the position of near-eye display system 120. For example, headset tracking module 114 may adjust the focus of imaging device 150 to obtain a more accurate position for observed locators on near-eye display system 120. Moreover, calibration performed by headset tracking module 114 may also account for information received from IMU 132. Additionally, if tracking of near-eye display system 120 is lost (e.g., imaging device 150 loses line of sight of at least a threshold number of locators 126), headset tracking module 114 may recalibrate some or all of the calibration parameters.

Artificial reality engine 116 may execute applications within artificial reality system environment 100 and receive position information of near-eye display system 120, acceleration information of near-eye display system 120, velocity information of near-eye display system 120, predicted future positions of near-eye display system 120, or some combination thereof from headset tracking module 114. Artificial reality engine 116 may also receive estimated eye position and orientation information from eye-tracking module 118. Based on the received information, artificial reality engine 116 may determine content to provide to near-eye display system 120 for presentation to the user. For example, if the received information indicates that the user has looked to the left, artificial reality engine 116 may generate content for near-eye display system 120 that reflects the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display system 120 or haptic feedback via input/output interface 140.

Eye-tracking module 118 may receive eye-tracking data from eye-tracking system 130 and determine the position of the user's eye based on the eye-tracking data. The position of the eye may include an eye's orientation, location, or both relative to near-eye display system 120 or any element thereof. Because the eye's axes of rotation change as a function of the eye's location in its socket, determining the eye's location in its socket may allow eye-tracking module 118 to determine the eye's orientation more accurately.

In some embodiments, eye-tracking module 118 may store a mapping between images captured by eye-tracking system 130 and eye positions to determine a reference eye position from an image captured by eye-tracking system 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye-tracking. Eye calibration parameters may include parameters that may change whenever a user dons or adjusts near-eye display system 120. Example eye calibration parameters may include an estimated distance between a component of eye-tracking system 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display system 120 may reach the eye (as in some augmented reality applications), the calibration parameters may include correction factors for intensity and color balance due to variations in light from the outside of near-eye display system 120. Eye-tracking module 118 may use eye calibration parameters to determine whether the measurements captured by eye-tracking system 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display system 120 experiencing greater than a threshold change in illumination due to external light. In some embodiments, at least some of the functions of eye-tracking module 118 may be performed by eye-tracking system 130.

Figure 2:
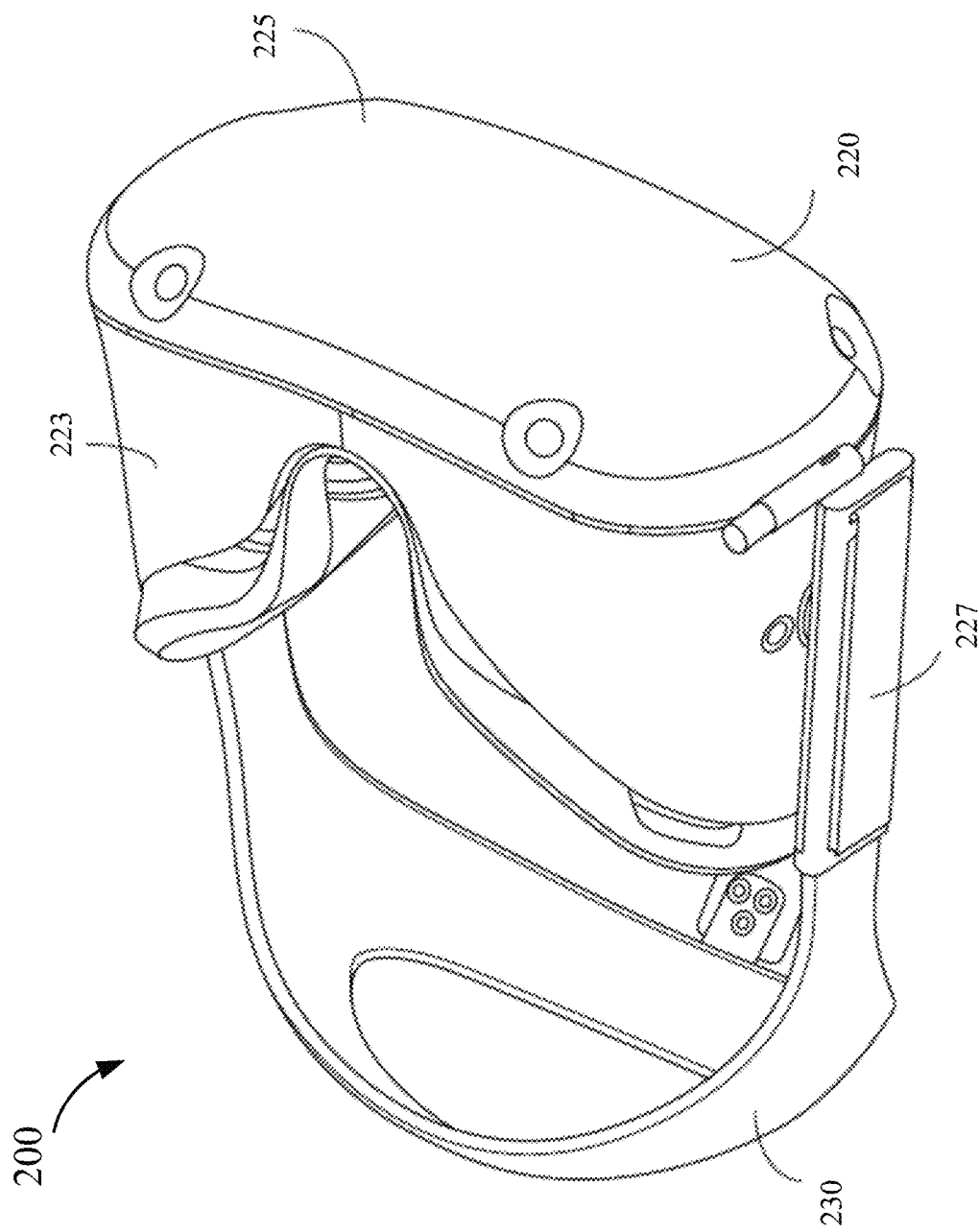
FIG. 2 is a perspective view of an example of a near-eye display system in the form of a head-mounted display (HMD) device for implementing some of the examples disclosed herein.

FIG. 2 is a perspective view of an example of a near-eye display system in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof.

The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (μLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye-tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
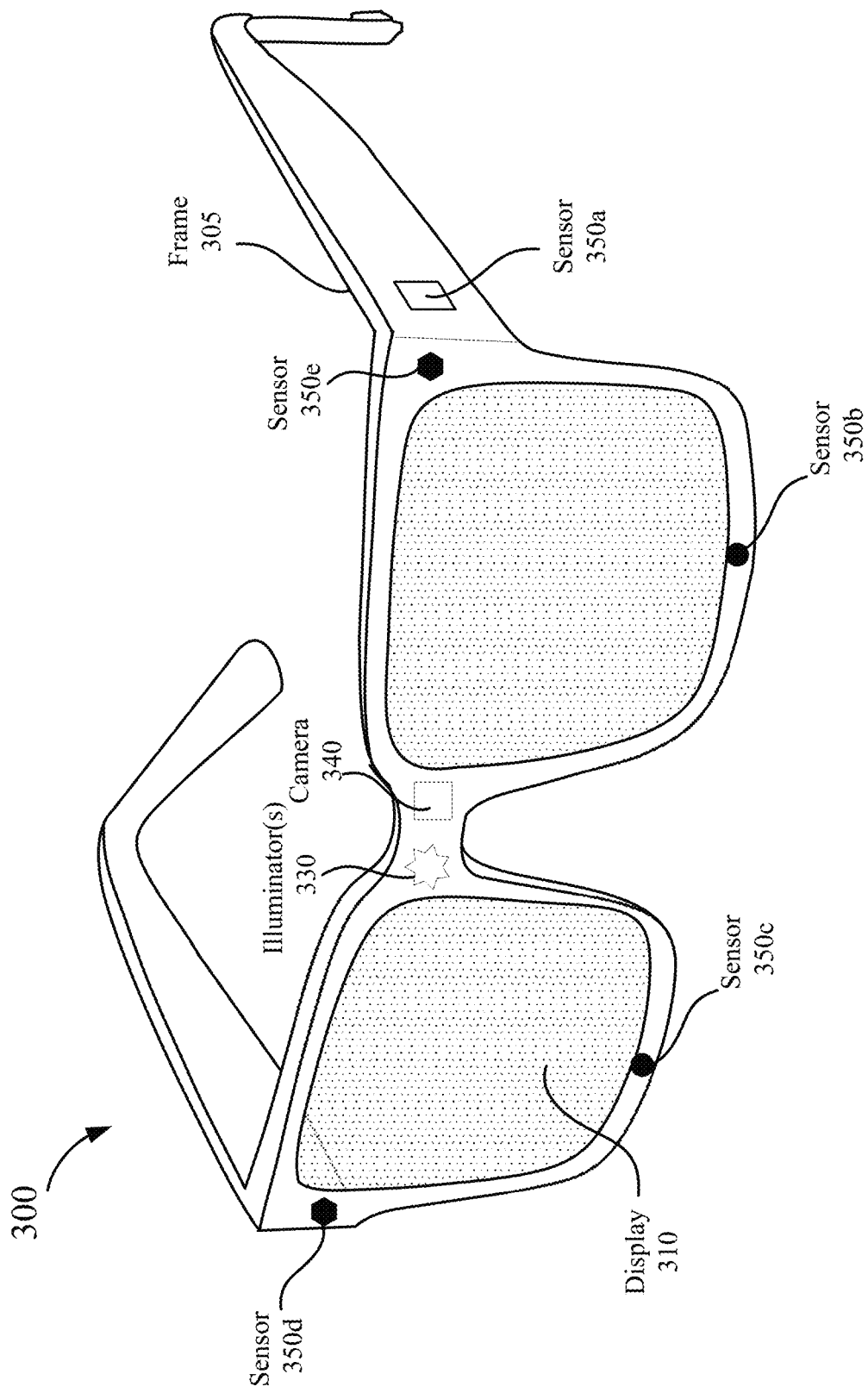
FIG. 3 is a perspective view of an example of a near-eye display system in the form of a pair of glasses for implementing some of the examples disclosed herein.

FIG. 3 is a perspective view of an example of a near-eye display system 300 in the form of a pair of glasses for implementing some of the examples disclosed herein. Near-eye display system 300 may be a specific implementation of near-eye display system 120 of FIG. 1, and may be configured to operate as a virtual reality display, an augmented reality display, and/or a mixed reality display. Near-eye display system 300 may include a frame 305 and a display 310. Display 310 may be configured to present content to a user. In some embodiments, display 310 may include display electronics and/or display optics. For example, as described above with respect to near-eye display system 120 of FIG. 1, display 310 may include an LCD display panel, an LED display panel, or an optical display panel (e.g., a waveguide display assembly).

Near-eye display system 300 may further include various sensors 350*a*, 350*b*, 350*c*, 350*d*, and 350*e* on or within frame 305. In some embodiments, sensors 350*a*-350*e* may include one or more depth sensors, motion sensors, position sensors, inertial sensors, or ambient light sensors. In some embodiments, sensors 350*a*-350*e* may include one or more image sensors configured to generate image data representing different fields of views in different directions. In some embodiments, sensors 350*a*-350*e* may be used as input devices to control or influence the displayed content of near-eye display system 300, and/or to provide an interactive VR/AR/MR experience to a user of near-eye display system 300. In some embodiments, sensors 350*a*-350*e* may also be used for stereoscopic imaging.

In some embodiments, near-eye display system 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350*a*-350*e* in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display system 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
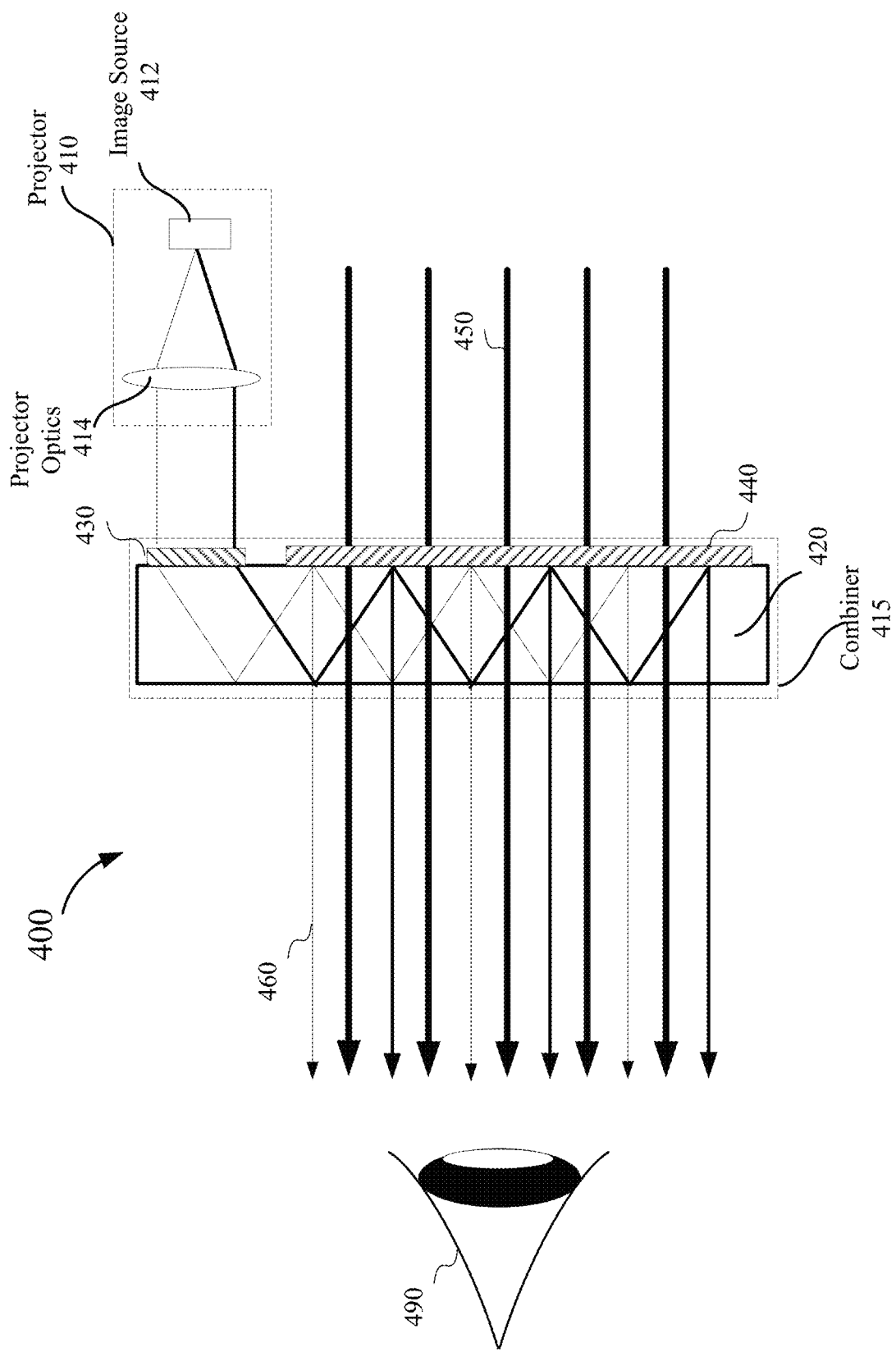
FIG. 4 illustrates an example of an optical see-through augmented reality system using a waveguide display that includes an optical combiner according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources, each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical element (DOE) (e.g., a surface-relief grating), a slanted surface of substrate 420, or a refractive coupler (e.g., a wedge or a prism). Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As with input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

In an artificial reality system, to improve user interaction with presented content, the artificial reality system may track the user's eye and modify or generate content based on a location or a direction in which the user is looking. Tracking the eye may include tracking the position and/or shape of the pupil and/or the cornea of the eye, and determining the rotational position or gaze direction of the eye. There may be several types of eye measurements for determining user intent, cognitive processes, behavior, attention, etc. These measurements may include, for example, measurement related to fixations, where the eyes are stationary between movements and visual input may occur. Fixation-related measurement variables may include, for example, total fixation duration, mean fixation duration, fixation spatial density, number of areas fixated, fixation sequences, and fixation rate. The eye measurements may also include measurements of saccades, which are rapid eye movements that occur between fixations. Saccade related parameters may include, for example, saccade number, amplitude, velocity, acceleration, and fixation-saccade ratio. The eye measurements may also include measurements of scan path, which may include a series of short fixations and saccades alternating before the eyes reach a target location on the display screen. Movement measures derived from the scan path may include, for example, scan path direction, duration, length, and area covered. The eye movement measurements may further include measuring the sum of all fixations made in an area of interest before the eyes leave that area or the proportion of time spent in each area. The eye measurements may also include measuring pupil size and blink rate, which may be used to study cognitive workload. One eye measurements technique referred to as Pupil Center Corneal Reflection (PCCR) method involves using NIR LEDs to produce glints on the eye cornea surface and then capturing images/videos of the eye region. Gaze direction can be estimated from the relative movement between the pupil center and glints.

Figure 5:
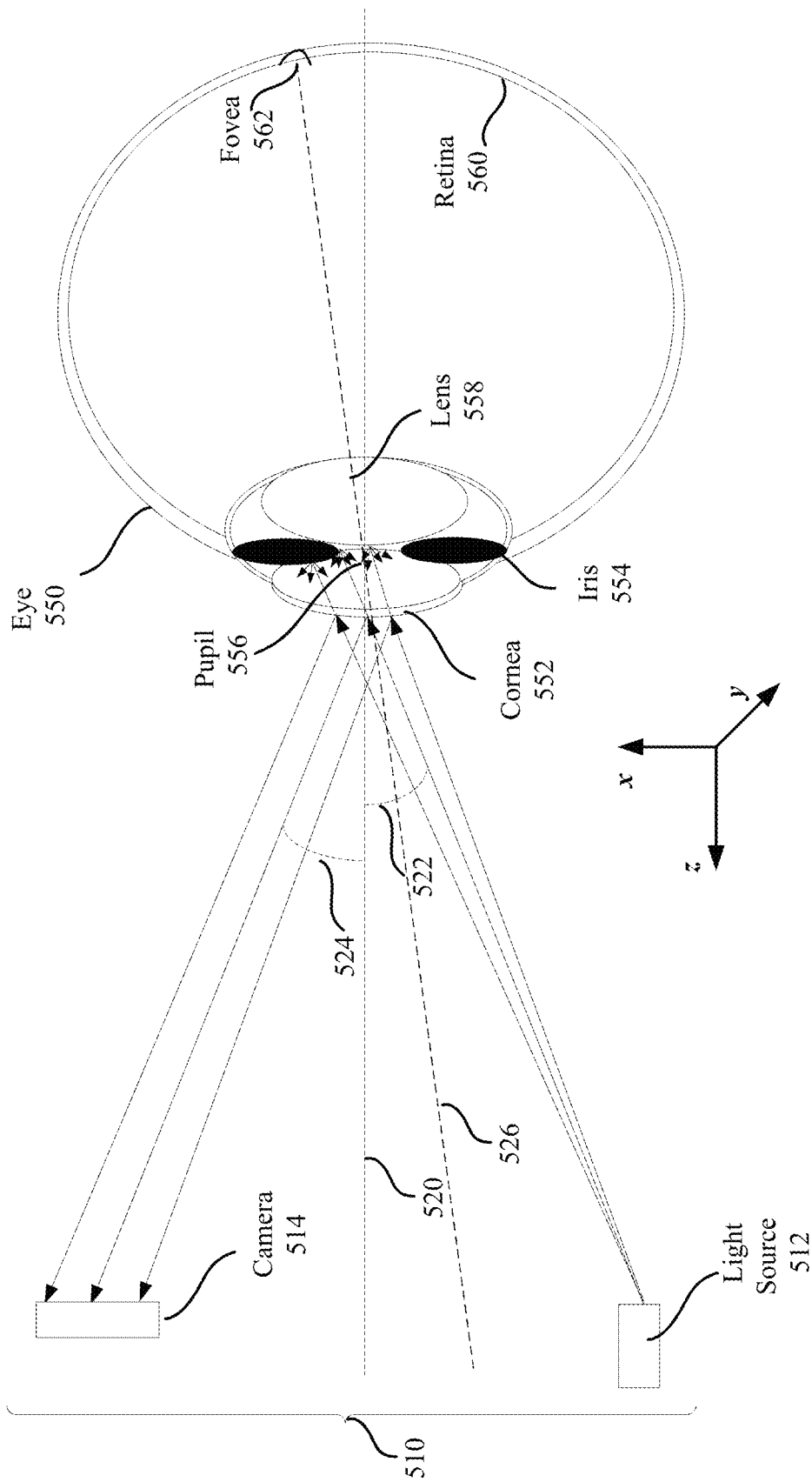
FIG. 5 illustrates light reflections and scattering by an eye during eye-tracking.

FIG. 5 illustrates light reflections and scattering by an eye 550 during eye-tracking using an eye-tracking system 510, such as eye-tracking system 130. Eye-tracking system 510 may include a light source 512 and a camera 514 as described above, where light source 512 and camera 514 may be attached to or embedded in, for example, the body of a near-eye display described above. For example, light source 512 and camera 514 may be positioned in the periphery of the field of view of the user's eye, such as in the frame of the near-eye display, such that they may not affect the user's view of the display image or the surrounding environment. In some embodiments, eye-tracking system 510 may include different and/or additional components than those depicted in FIG. 5. Light source 512 may include, for example, a laser, an LED, a micro-LED, or vertical-cavity surface-emitting lasers (VCSELs), and may be mounted at an angle 522 relative to a surface normal vector 520 of eye 550. Surface normal vector 520 is orthogonal to a portion of the surface (e.g., cornea 552) of eye 550 illuminated by light source 512. In the example shown in FIG. 5, surface normal vector 520 may be the same as the pupillary axis (also referred to as optical axis, which may be a line passing through the center of pupil 556 and the center of cornea 552) of eye 550. Angle 522 may be measured between surface normal vector 520 and a line from a center of the portion of the surface of eye 550 illuminated by light source 512 to a center of the output aperture of light source 512. Camera 514 may be mounted at a camera angle 524 relative to surface normal vector 520 of eye 550. Camera angle 524 may be measured between surface normal vector 520 and a line from a center of the portion of the surface of eye 550 illuminated by light source 512 to a center of the image sensor or light input aperture of camera 514. In some embodiments, a difference between angle 522 and camera angle 524 is less than a threshold amount so that camera 514 may capture images via specular reflections of light incident on cornea 552 of eye 550, which may beneficially increase contrast of the resulting image and minimize light power loss and power consumption.

The light emitted by light source 512 may substantially uniformly illuminate a portion of the eye surface (e.g., cornea 552). A portion of the emitted light may be reflected specularly by cornea 552 of eye 550 and captured by camera 514. In some cases, the light incident on eye 550 may propagate into the eye for a small distance before being reflected. For example, at least some portions of the light may enter eye 550 through cornea 552 and reach iris 554, pupil 556, lens 558, or retina 560 of eye 550. Because some interfaces within eye 550 (e.g., surface of iris 554) may be rough (e.g., due to features such as capillaries or bumps), the interfaces within eye 550 may scatter the incident light in multiple directions. Different portions of the eye surface and the interfaces within eye 550 may have different patterns of features. Thus, an intensity pattern of the light reflected by eye 550 may depend on the pattern of features within the illuminated portion of eye 550, which may allow identification of the portions of the eye (e.g., iris 554 or pupil 556) from the intensity pattern.

Camera 514 may collect and project light reflected by the illuminated portion of eye 550 onto an image sensor of camera 514. Camera 514 may also correct one or more optical errors (such as those described with respect to display optics 124) to improve the contrast and other properties of the images captured by the image sensor of camera 514. In some embodiments, camera 514 may also magnify the reflected light. In some embodiments, camera 514 may enlarge the images. The image sensor of camera 514 may capture incident light focused by a lens assembly of camera 514. Thus, camera 514 may effectively capture an image of light source 512 (the emitted light of which is reflected specularly by the cornea of the eye) reflected by the eye, resulting in a "glint" in the captured image. Because of the scattering (diffusive reflections) at some interfaces of the eye, light incident on a point of the image sensor may include light reflected from multiple points within the illuminated portion of eye 550, and thus may be the result of the interference of the light reflected from the multiple points. Thus, in some embodiments, the image sensor of camera 514 may also capture a diffraction or speckle pattern formed by a combination of light reflected from multiple points of the surface of eye 550.

Each pixel of the image sensor may include a light-sensitive circuit that can output a current or voltage signal corresponding to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 514 may include a complementary metal-oxide semiconductor (CMOS) pixel array, which may be used with light having a wavelength less than about 750 nm. As another example, the image sensor of camera 514 may include an indium gallium arsenide (InGaAs) alloy pixel array or a charge-coupled device (CCD). Such an image sensor may be used with a laser emitting light having a wavelength between about 900 nm and about 1160 nm.

In some embodiments, to determine a position change of eye 550, an eye-tracking module (e.g., eye-tracking system 130 or eye-tracking module 118 of FIG. 1) may determine a pixel shift between images. Multiplying the pixel shift by a calibrated distance per pixel may allow the eye-tracking module to determine a distance the surface (e.g., cornea 552) of eye 550 has shifted. For example, if the glint captured in one image is shifted by two pixels relative to the glint captured in a previous image, and each pixel corresponds to a distance of 10 micrometers at the surface of eye 550, the surface of eye 550 may have moved about 20 micrometers.

In some embodiments, eye-tracking techniques used in head-mounted devices may be video-based and may be performed based on appearance or features. For example, the appearance-based techniques may use certain mapping functions to map the entire eye image or a region of interest of the eye image to a gaze direction or point-of-gaze. The mapping function may have a high-dimensional input (e.g., the intensities of image pixels) and a low-dimensional output (e.g., the gaze direction, point-of-gaze, etc.). These mapping functions may be based on machine learning models, such as convolutional neural networks (CNNs).

The feature-based techniques may perform feature extraction and gaze estimation using the extracted features. The features can be any one or more of the following: pupil center, iris center, pupil-iris boundary, iris-sclera boundary, first Purkinje images (reflections off the front surface of the cornea, known as corneal reflections or glints), fourth Purkinje images (reflections of the back surface of the crystalline lens), eye corners, and the like. These features may be extracted using computer vision techniques (e.g., intensity histogram analysis, thresholding, edge detection, blob segmentation, convex-hull, morphological operations, shape fitting, deformable templates, centroiding, etc.) or machine-learning techniques, or any combination. The gaze estimation techniques can be interpolation-based or model-based. The interpolation-based techniques may use certain mapping functions (e.g., second degree bivariate polynomial) to map eye features (e.g., pupil center or pupil center-corneal reflection (PCCR) vector) to the gaze direction. The coefficients of these mapping functions may be obtained through a personal calibration procedure that may involve collecting data while the user fixates at a sequence of fixation targets with known coordinates. This calibration may be performed for each subject and each session, and may sometimes be performed multiple times in each session, because the calibration may be sensitive to slippage of the head-mounted device relative to the head. The mapping functions may then use the calibration data points and interpolation techniques to determine the gaze direction. The model-based methods may use models of the system (e.g., camera(s) and/or light source(s)) and the eye that may include actual physical system parameters and anatomical eye parameters to determine a 3-D gaze from a set of eye features (e.g., pupil boundary and multiple corneal reflections) according to 3-D geometry. Model-based techniques may perform both a one-time system calibration and a one-time personal calibration for each user. The data collection procedure for the personal calibration may be similar to that of the interpolation-based methods.

Alternatively or additionally, the eye-tracking module may determine the position of the eye in a captured image by comparing the captured images with one or more previous images having known positions of the eye. For example, the eye-tracking module may include a database of images that are each associated with a reference eye position. By matching the captured image with a stored image, the eye-tracking module may determine that the eye is at the reference eye position associated with the stored image. In some embodiments, the eye-tracking module may identify a feature in a portion of a captured image. The feature may include a diffraction or optical flow pattern associated with a particular portion of eye 550, such as the pupil or the iris. For example, the eye-tracking module may determine the eye position by retrieving a reference eye position associated with the feature (which was also captured in a reference image), determining a pixel shift between the feature in the captured image and the feature in the reference image, and determining the eye position based on the determined pixel shift with respect to the reference eye position and the calibrated distance per pixel as described above.

As discussed above, camera 514 may effectively capture an image of light source 512 reflected by cornea 552 of eye 550. In some embodiments, the eye-tracking module may determine a gaze direction of the user's eye based on the locations of the images of the light sources (e.g., glints) on cornea 552 in the captured image. The gaze direction may be determined by a foveal axis 526 of the user's eyes, where foveal axis 526 (also referred to as "visual axis") may be a line passing through the center of pupil 556 and the center of fovea 562.

Figure 6:
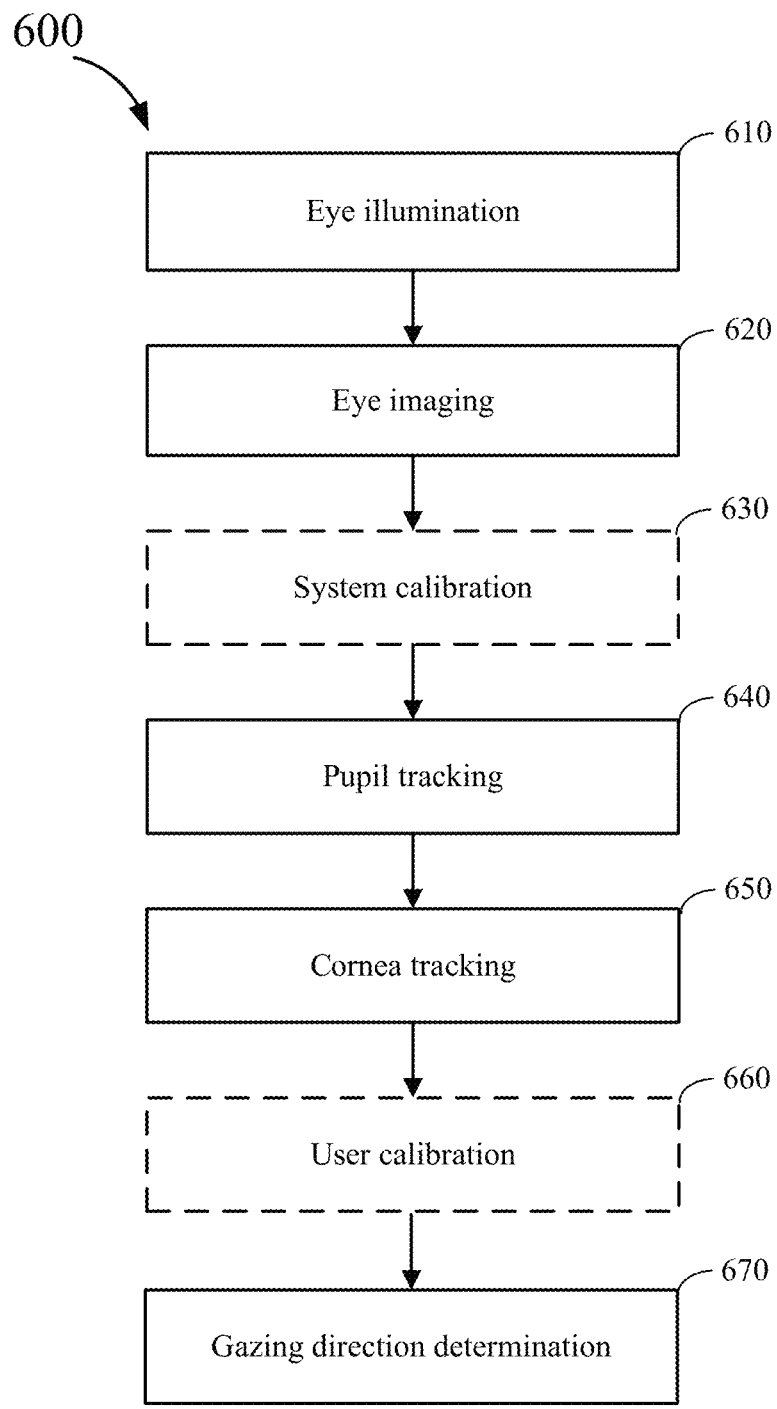
FIG. 6 is a simplified flow chart illustrating an example of a method for tracking the eye of a user of a near-eye display system according to certain embodiments.

FIG. 6 is a simplified flowchart 600 illustrating an example of a method for tracking the eye of a user of a near-eye display system according to certain embodiments. The operations in flowchart 600 may be performed by, for example, eye-tracking system 130 or 510 described above. At block 610, one or more light sources may illuminate the user's eye. In various embodiments, the light sources may be located in the field of view of the user's eye or at a periphery of the field of view of the user's eye. In some embodiments, a light source may be located at the periphery of the field of view of the user's eye, and the light from the light source may be guided and directed to the user's eye from locations in the field of view of the user's eye.

At block 620, an imaging device (e.g., a camera) may collect light reflected by the user's eye and generate one or more images of the user's eye. As described above, the cornea of the user's eye may specularly reflect the illumination light, while some portions of the user's eye (e.g., iris) may diffusively scatter the illumination light. The images of the user's eye may include portions (e.g., the iris region and/or the pupil portion) where the contrast may be different due to the scattering of the illumination light. The images of the user's eye may also include glints caused by the specular reflection of the illumination light by the user's cornea.

Figure 7B:
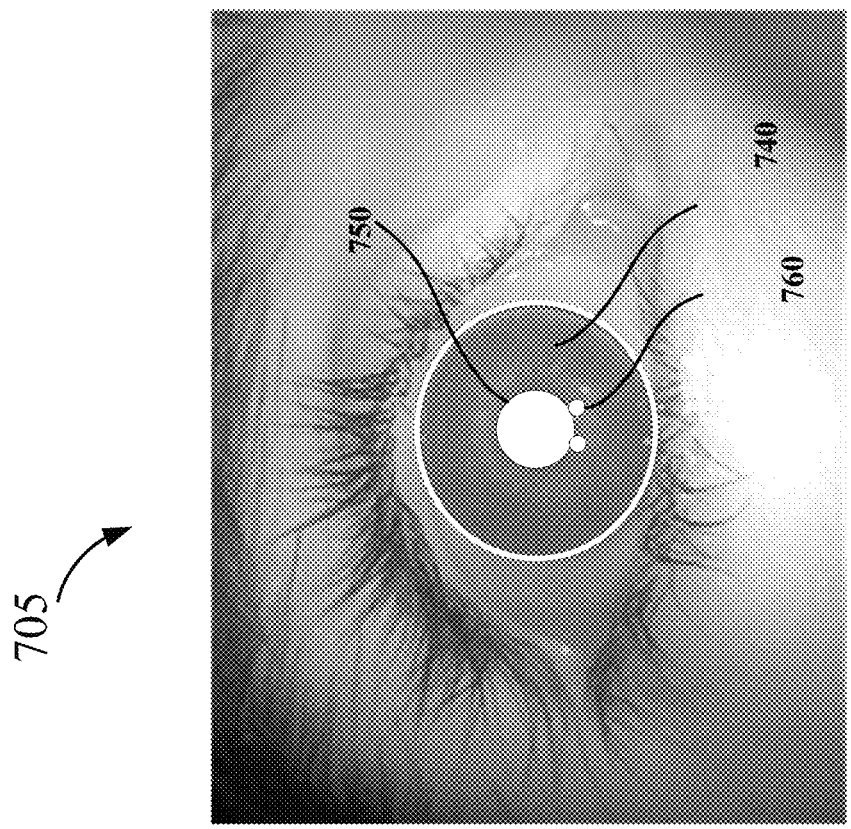
FIG. 7B illustrates an example of an identified iris region, an example of an identified pupil region, and examples of glint regions identified in an image of the user's eye according to certain embodiments.
Figure 7A:
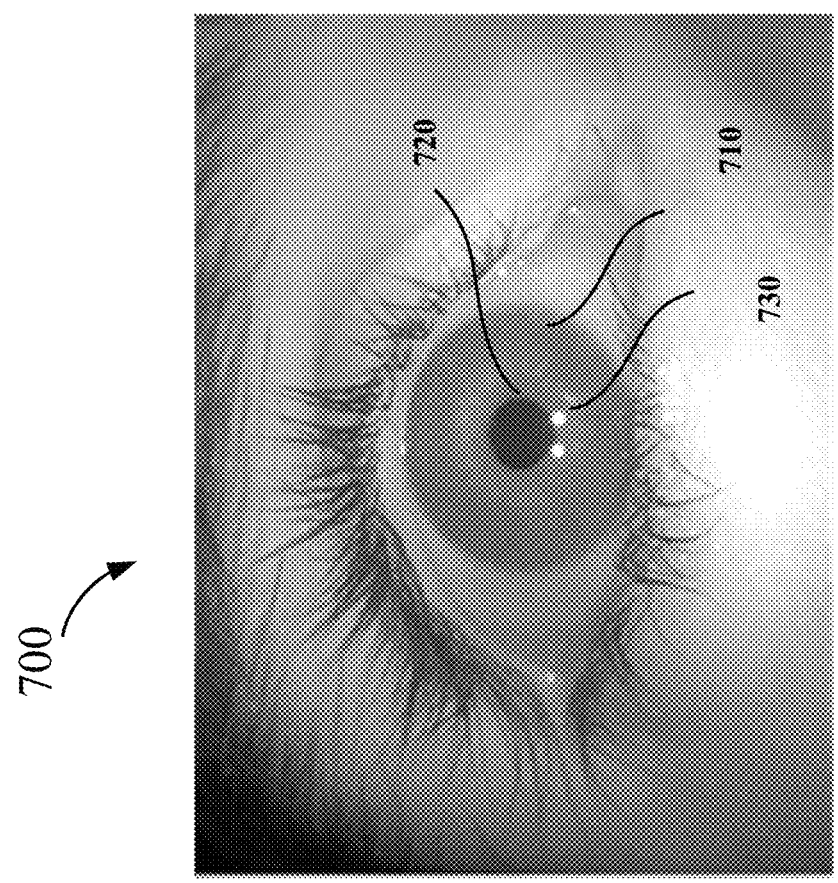
FIG. 7A illustrates an example of an image of a user's eye captured by a camera for eye-tracking according to certain embodiments.

FIG. 7A illustrates an example of an image 700 of a user's eye captured by a camera according to certain embodiments. Image 700 includes an iris region 710, a pupil region 720, and multiple glints 730. Glints 730 may be caused by illumination light specularly reflected off the cornea of the user's eye.

Optionally, at block 630, the eye-tracking system may perform system calibration to improve the precision and accuracy of eye-tracking as described above with respect to eye-tracking module 118. The system calibration may include, for example, calibrating the eye-tracking optical path (such as extrinsic (e.g., position or orientation) and intrinsic camera parameters), positions of the light sources, and the display optical path (e.g., position of the display, extrinsic and intrinsic parameters of the display optics, etc.).

At block 640, the location of the center of the pupil of the user's eye may be determined based on the scattering of the illumination light by, for example, the iris of the user's eye. As described above, the boundaries of the pupil and/or the iris may be determined based on image segmentation of the pupil region in the captured image as shown in FIG. 7A. Based on the boundaries of the pupil, the location of the center of the pupil may be determined.

At block 650, the position of the cornea of the user's eye may be determined based on the locations of the glints in the captured image of the user's eye as shown in FIG. 7A. As described above, the locations of the glints may be determined using, for example, a Gaussian centroiding technique. The accuracy and precision of the determined locations of the glints may depend on the locations of the light sources (or virtual or effective light sources). Based on the locations of two or more glints, the position of the cornea may be determined using, for example, nonlinear optimization and based on the assumption that the cornea (in particular, the corneal apex) is close to a sphere.

FIG. 7B illustrates an example of an image 705 including an iris region 740, an example of an identified pupil region 750, and examples of glint regions 760 identified in image 700 of the user's eye according to certain embodiments. As illustrated, edges of iris region 740 and pupil region 750 are identified. The center of pupil region 720 may then be determined based on the edges of pupil region 750 and/or iris region 740. The locations of glints 730 can also be determined based on the locations of glint regions 760 identified in image 700. Based on the locations of glint regions 760, the position of the center of the cornea may be determined.

Optionally, at block 660, the eye-tracking system may perform user calibration to determine certain eye calibration parameters for improving the precision and accuracy of eye-tracking as described above with respect to eye-tracking module 118 and FIG. 5. The user calibration may include, for example, determining the eye model parameters (e.g., anatomical eye parameters) or the coefficients of some mapping functions that may not depend on a particular eye parameter. Other examples of the eye calibration parameters may include an estimated average eye radius, an average corneal radius, an average sclera radius, a map of features on the eye surface, and an estimated eye surface contour. As described above, a kappa angle between the pupillary axis (optical axis) and the foveal axis (visual axis) of the use's eye may be different for different users, and thus may need to be calibrated during the calibration. In some embodiments, the calibration may be performed by displaying a set of target points distributed over a display screen according to a certain pattern, and the user is asked to gaze at each of the target points for a certain amount of time. The camera may capture the corresponding eye positions for the target points, which are then mapped to the corresponding gaze coordinates or directions, and the eye-tracking system may then learn the mapping function or the model parameters. In some embodiments, the calibrations at block 630 and 660 may only be performed once when the near-eye display system is put on or moved.

At block 670, the gaze direction of the user's eye may be determined based on, for example, the location of the center of the pupil and the position of the center of the cornea. In some embodiments, the pupillary axis of the user's eye may be determined first and may then be used to determine the foveal axis (or line of sight, gaze direction, or visual axis) of the user's eye, for example, based on an angle between the pupillary axis and the foveal axis.

As described above, in many cases, the viewing direction may need to be determined with a high accuracy, such as less than 5°, less than 1°, or better. The peripheral location of the light sources may negatively impact the accuracy of eye-tracking due to, for example, the angles of the illuminating light from the light sources to the eye. The eye-tracking system may also need to be robust in order to accommodate for extreme changes in the viewing direction and variations in facial features surrounding user's eyes, such as cases where portions of the eye, including portions of the iris or the pupil, may be obscured by, for example, eyelids or eye lashes. Obscurations may often occur when, for example, the user looks in a downward direction or when the user rapidly re-acquires the viewing direction after the eyelids reopen during eye blinks.

In-field illumination may offer greater eye-tracking accuracy than positioning the light sources at the periphery of the user's field of view. For example, the probability of capturing glints off the cornea over all gaze angles of the eye is higher when the light sources are located within the field of view of the user. Further, positioning the light sources within the user's field of view may offer greater flexibility in the placement and distribution of the light sources, such that the amount of light captured by the camera is maximized and thus the intensity of the output light from the light sources and the power consumption of the light sources can be reduced. However, in-field illumination may have several challenges. For example, the light sources (e.g., LEDs) in the field of view of the user may affect the see-through quality of the real world images and the displayed images.

Glint tracking techniques may be able to achieve an accuracy on the order of about one degree after calibration. But such accuracy may be difficult to achieve across the wide variety of human eye shapes and sizes. In addition, three-dimensional (3D) data (e.g., depth information) obtained from glint tracking is generally sparse because only a small number of infrared (IR) point sources may be used to illuminate specific locations on the surface of the eye, and thus only a small number of depth points may be measured. Because only a few points on the surface of the eye may be sampled by the glints, the depth computation may often use an idealized model of the human eye that may not be valid for all users. In addition, for AR devices (e.g., waveguide-based optical see-through AR devices) in which the display is transparent and the device is expected to undergo all-day, untethered use in a stylish form factor, there may be more constraints on the mechanical layout of the light sources and imaging devices, as well as the size, weight, and power consumption of the AR devices. Furthermore, for AR devices operating outdoors, reflections of the real world environment may result in glint-like reflections that may be confusing to or misinterpreted by the eye-tracking algorithms.

Interferometric fringe patterns generated by the interference of coherent laser beams may also be used for eye illumination in eye tracking. In some implementations, the interferometric fringe pattern may be formed by waveguides and in-field couplers, where the waveguides and the in-field couplers may be formed in or on a substrate placed in the field of view of the user's eye. For example, a coherent light beam generated by a laser may be split and coupled into waveguides, or may be coupled into a waveguide and then split by one or more waveguide beam splitters, such as a binary tree of beam splitters. The light beams propagating in the waveguides may be coupled out of the waveguides and directed to the user's eye by couplers. Each pair of coherent light beams overlapping on the user's eye may interfere to form an interferometric fringe pattern on the user's eye. The couplers may include, for example, holographic grating couplers, surface-relief grating couplers, grating couplers formed by surface acoustic wave modulators, or micromirrors (e.g., hot mirrors). These couplers may generally have low coupling efficiencies and/or may be difficult or costly to fabricate or integrate with other components in the system. For example, various silicon-based etched grating couplers may be used to couple light out of the waveguide and direct the out-coupled light to a certain direction. However, these silicon-based etched grating couplers may need to be fabricated using complicated lithography and etching processes, and may have a low coupling efficiency (e.g., less than about 60%). It may also be difficult to fabricate the waveguide and the etched grating couplers on a substrate using compatible processes.

According to certain embodiments disclosed herein, an eye-illumination subsystem of an eye-tracking system may include a substrate configured to be placed in a field of view of an eye of a user of the near-eye display, a plurality of light sources outside of the field of view of the eye of the user and configured to emit illumination light (e.g., IR light, such as NIR light), a plurality of waveguides formed in or on the substrate and configured to guide the illumination light, and a plurality of polarization volume holograms (PVHs, also referred to as polarization volume gratings (PVGs) or Bragg polarization gratings (BPGs)) configured to diffract the illumination light from the plurality of waveguides into light beams that propagate towards the eye of the user. The waveguides may be small and/or may be transparent to visible light, and PVHs may also be transparent to visible light. Thus, the waveguides and the PVHs can be placed in the field of view of the user's eye, such as being formed on the substrate. In some embodiments, the eye-illumination subsystem may include a large number of waveguides and PVHs to generate a large number of narrow beams and form a large number of glints on a user's eye, where the glints may form a pattern on the user's eye. In some embodiments, the light beams from the plurality of PVH may be coherent and may have large solid angles, and thus may overlap and interfere on the user's eye to form interferometric fringe patterns on the user's eye. One or more cameras may collect light reflected from the user's eye to capture images of the user's eye with the interferometric fringe patterns or glints, which may be analyzed to determine a depth profile or a position of the user's eye.

In one example, the light source may be a coherent light source, the waveguides may be single-mode waveguides, and each PVH may have a varying grating period and may diffract incident light into multiple directions in a solid angle. A pair of light beams diffracted by a pair of PVHs may overlap and interfere at the user's eye to produce a light pattern in the form of a sinusoidal interference pattern (referred to herein as an interferometric fringe pattern or a structured light pattern). Accordingly, the PVHs may project an interferometric fringe pattern (e.g., parallel or crossed fringes) onto the surface of the eye, thereby densely sampling the eye's surface. Due to the three-dimensional profile of the user's eye, two-dimensional (2D) images of the user's eye captured by the camera(s) may include interferometric fringe pattern distorted by the user's eye. Based on information in the images captured by camera(s), such as the distortion of the interferometric fringe pattern by the user's eye, a 3D image or depth image of the surface of the user's eye can be computed. The eye's position and gaze direction may be determined, for example, using the 3D images. The image content displayed on a display panel may then be adjusted accordingly based on the eye's position or the gaze direction and/or gaze point of the user.

In another example, the light source may not need to be a coherent light source, and the eye-tracking system may include a large number of waveguides and PVHs to generate a large number of light beams. Each PVH may have a uniform grating period and may diffract incident light into one direction. Thus, the light beams diffracted by the PVHs may be narrow beams and may not overlap and interfere at the user's eye, but may form a two-dimensional pattern of glints on the user's eye.

The PVHs disclosed herein may be placed in the field of view of the user's eye, and may diffract the illumination light at a high diffraction efficiency. Thus, a highly efficient in-field illumination may be achieved. In addition, the PVHs may be able to generate diffracted light beams having large solid angles such that the diffracted light beams may interfere in a large overlapped region to form a large interferometric fringe pattern. One pair of PVHs may be used to generate one set of fringes. Multiple sets of fringes with different orientations and/or periods may be generated using multiple pairs of PVHs. The PVHs may be much easier to fabricate than some other types of grating couplers, such as etched grating couplers. For example, PVHs may be made by spin coating multiple liquid crystal reactive mesogens layers on a substrate with surface photoalignment or using photo-crosslinkable liquid crystalline polymers and bulk photoalignment. Therefore, the use of the interferometric fringe pattern or glint pattern generated using in-field PVHs can result in a densely sampled and more accurate depth profile of the eye, and thus can provide for an integrated eye-tracking system that is accurate, power efficient, and cost effective.

Figure 8:
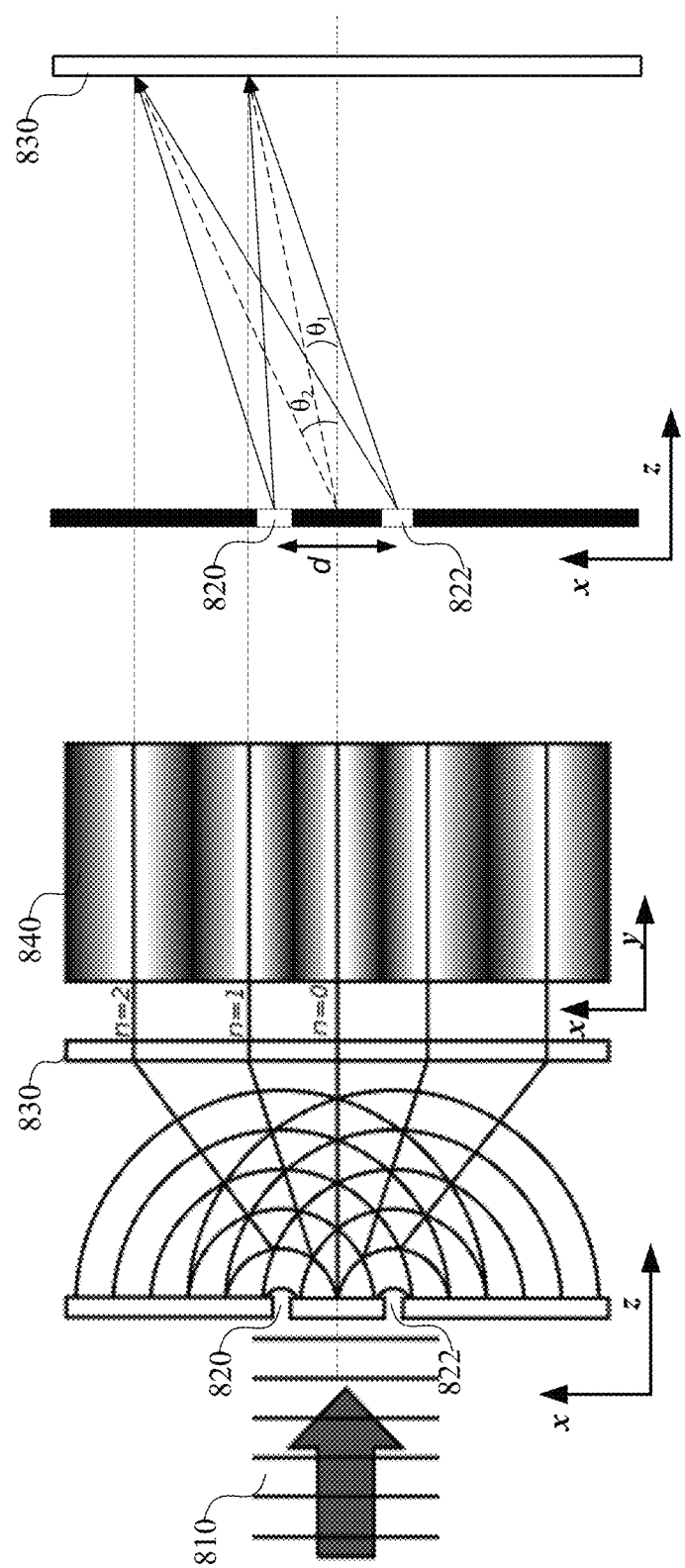
FIG. 8 illustrates an example of interference by two coherent light beams to form a fringe pattern.

FIG. 8 illustrates an example of interference by two coherent light beams to form a fringe pattern. In the illustrated example, the two coherent light beams may be generated by passing a planar wave 810 through two slits 820 and 822 (or two other optical paths), and thus the two light beams may have the same frequency and a certain fixed phase relation at the two slits 820 and 822 (which may function as two point sources). When the two light beams of the same frequency $\omega=2\pi f$ are superimposed at a point on a surface 830, they may excite oscillations in the same direction. The electrical fields of the two light beams at the superposed point may be described as:

$$E_1(t)=A_1 \cos(\omega t+\varphi_1),$$

and $$E_2(t)=A_2 \cos(\omega t+\varphi_2),$$

where $\varphi_1$ and $\varphi_2$ are the phases of the electric fields of the two light beams at the superposed point, and A1 and A2 are the amplitude of the electric fields of the two light beams. The resulting oscillation at the superposed point may be determined by:

$$A^2=A_1^2+A_2^2+2A_1A_2 \cos(\delta),$$

where $\delta=\varphi_1-\varphi_2$ is the phase difference, which may remain constant over time. Therefore, the intensity at a superposed point may also have a constant value over time. For different points on surface 830, the phase difference $\delta$ may be different and thus the intensity of the superposition of the two light beams at different points on surface 830 may be different. For example, the intensity at points where the phase difference $\delta$ is $2n\pi$ ($n=0, \pm1, \pm2, \ldots$) may be high (bright) and the intensity at points where the phase difference $\delta$ is $(2n+1)\pi$ ($n=0, \pm1, \pm2, \ldots$) may be low (dark). The bright and dark points on surface 830 may form an interferometric fringe pattern 840 that includes a plurality of interference fringes, where each fringe may have an intensity that varies from minimum to maximum and back to minimum. The interference fringes may be at different locations in a direction along which the two point sources are arranged, and each interference fringe may extend in a direction perpendicular to the direction along which the two point sources are arranged. For example, when the two point sources are arranged at different points on the x axis, the interference fringes may be at different x locations, and each interference fringe may extend in the y direction. In the illustrated example, the locations of the bright points on surface 830 may be at angles $\theta_n$ with respect to a center of the two slits 820 and 822, where:

$$d \times \sin \theta_n = n\lambda \text{ for } n=0,\pm1,\pm2,\ldots.$$

Thus, the periodicity of the interferometric pattern on surface 830 may be controlled by controlling the distance between the two slits 820 and 822 (or two coherent light sources).

FIG. 9A illustrates an example of a near-eye display 900 including an eye-tracking system that uses an interferometric fringe pattern 960 generated using PVHs 950 for three-dimensional eye tracking according to certain embodiments. As illustrated, near-eye display 900 may include a frame 910 and a substrate 920 for each eye. Substrate 920 may be held by frame 910, and may include any suitable material, such as glass, plastic, polymer, PMMA, silica, SiC, sapphire, ceramic, crystal (such as lithium niobate or tellurium dioxide), a semiconductor material, and the like. Substrate 920 may be transparent to visible light and IR light. Substrate 920 may have a flat or curved broadside surface.

In the illustrated example, the eye-tracking system includes a light source 930 that generates coherent light, such as a Vertical External-Cavity Surface-Emitting Laser (VECSEL), a Vertical-Cavity Surface-Emitting Laser (VCSEL), a superluminescent diode (SLED), a tunable laser, a quantum dot laser, an edge emitting laser, or a laser diode. Light source 930 may emit light having a wavelength outside of the visible spectrum (e.g., between about 380 nm and about 750 nm). For example, light source 930 may emit light in the infrared (IR) band (e.g., between about 750 nm and about 1700 nm). Light source 930 may be attached to frame 910 or may be in frame 910 or substrate 920. Light source 930 may be controlled by a controller, a processor, or another control system (not shown in FIG. 9) within or coupled to near-eye display 900.

The light emitted by light source 930 may be coupled into waveguides 940 through, for example, an edge coupler including an adiabatically tapered waveguide or a grating coupler. Waveguides 940 may be formed in or on substrate 920 and may include any suitable type of waveguides, such as buried channel waveguides, ridge waveguides, microstrip waveguides, or stripline waveguides. In some embodiments, waveguides 940 may include a core layer and cladding layers, where the core layer may include, for example, SiO$_2$, and may have a refractive index greater than the refractive indices of the cladding layers. Waveguides 940 may include one or more splitters that split the light coupled into waveguides 940 into two or more beams propagating in two or more waveguides 940. The two or more beams may have substantially the same amplitude. Each waveguide 940 may include a taper structure 942 that may expand the beam at an end section of waveguide 940.

A PVH 950 may be formed on taper structure 942 and may be configured to couple the light beam guided by waveguide 940 out of waveguide 940 towards a user's eye 990. In some embodiments, a polarization converter, such as a quarter-wave plate, may be used between PVH 950 and waveguide 940. Two light beams coupled out of two waveguides 940 by two PVHs 950 and propagating towards user's eye 990 may each have a large solid angle and thus may have a large overlapped area on the user's face. The two light beams may interfere with each other in the overlapped area to form interferometric fringe pattern 960 on the user's eye and face as described above with respect to FIG. 8 and shown in FIG. 9A. The distance between adjacent bright fringes or dark fringes may depend on the distance d between the centers of two PVHs 950, the wavelength of the light emitted by light source 930, and the distance between PVHs 950 and user's eye 990. For example, interferometric fringe pattern 960 may become finer and may be used to measure smaller features, when the distance d between the centers of two PVHs 950 is increased.

FIG. 9B illustrates an example of a two-dimensional image 962 of a user's eye illuminated by an interferometric fringe illumination pattern according to certain embodiments. The interferometric fringe illumination pattern may be generated by the eye-tracking system of FIG. 9A and may include bright and dark fringes. Image 962 may be captured by a camera. As illustrated by FIG. 9B, due to the non-flat surfaces of the user's eye and face, the fringes on the user's eye and face as captured in the two-dimensional image 962 may be distorted. The distortion between the fringes formed on a flat surface and the fringes in the captured image 962 may provide information of the profile and position of the user's eye.

FIG. 9C illustrates an example of a three-dimensional profile 964 of a user's eye reconstructed from two-dimensional images (e.g., image 962) of the user's eye illuminated by an interferometric fringe illumination pattern according to certain embodiments. In some embodiments, 3D profile 964 of the user's eye may be generated based on the distortion of the interferometric fringe illumination pattern by the user's eye. In some embodiments, 3D profile 964 of the user's eye may be generated using two or more 2D images captured by two or more cameras at different locations from different perspectives. In some embodiments, techniques such as triangulation may be used to determine the 3D profile 964. Information such as the position or gaze direction of the user's eye may be extracted from 3D profile 964 and may be used, for example, for image rendering.

Figures 10A, 10B:
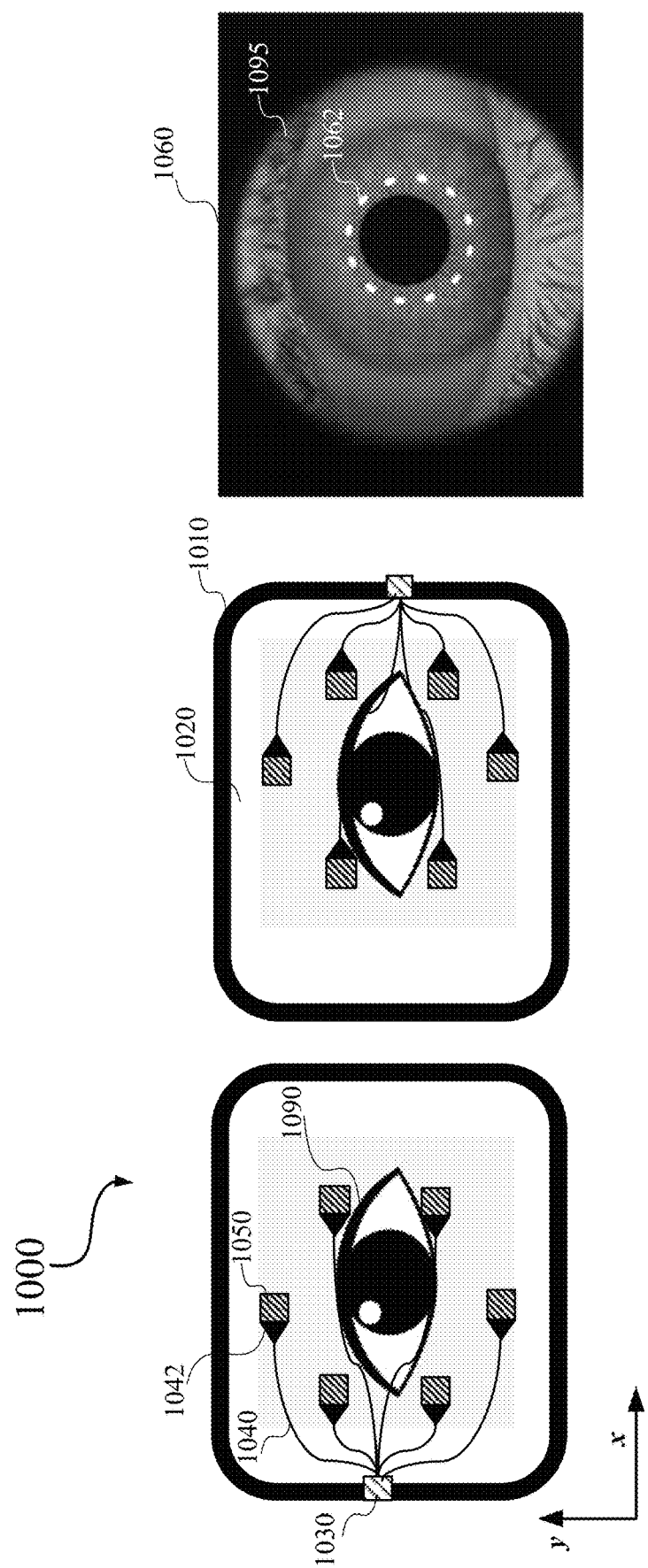
FIG. 10A illustrates an example of a near-eye display including an eye-tracking system that uses glints for eye tracking according to certain embodiments.
FIG. 10B illustrates an example of an image of a user's eye including glints according to certain embodiments.

FIG. 10A illustrates an example of a near-eye display 1000 including an eye-tracking system that uses glints for eye tracking according to certain embodiments. As in near-eye display 900, the eye-tracking system in near-eye display 1000 may include a frame 1010 and a substrate 1020 for each eye. Substrate 1020 may be held by frame 1010, and may include any suitable material, such as glass, plastic, polymer, PMMA, silica, SiC, sapphire, ceramic, crystal (such as lithium niobate or tellurium dioxide), a semiconductor material, and the like. Substrate 1020 may be transparent to visible light and IR light. Substrate 1020 may have a flat or curved broadside surface.

The eye-tracking system may include one or more light sources 1030 that generate coherent or noncoherent light, such as a light emitting diode (LED), a micro-LED, a resonant cavity micro-LED, a VECSEL, a VCSEL, a SLED, a tunable laser, a quantum dot laser, an edge emitting laser, or a laser diode. Light source 1030 may emit light with wavelengths outside of the visible spectrum (e.g., between about 380 nm and about 750 nm). For example, light source 1030 may emit light in the infrared (IR) band (e.g., between about 750 nm and about 1700 nm). Light source 1030 may be attached to frame 1010 or may be in frame 1010 or substrate 1020. Light source 1030 may be controlled by a controller, a processor, or another control system (not shown in FIG. 10) within or coupled to near-eye display 1000.

The light emitted by light source 1030 may be coupled into waveguides 1040 through, for example, an edge coupler including an adiabatically tapered waveguide or a grating coupler. Waveguides 1040 may be formed in or on substrate 1020 and may include any suitable type of waveguides, such as buried channel waveguides, ridge waveguides, microstrip waveguides, or stripline waveguides. In some embodiments, waveguides 1040 may include a core layer and cladding layers, where the core layer may include, for example, SiO$_2$, and may have a refractive index greater than the refractive indices of the cladding layers. Waveguides 1040 may include one or more splitters that split the light coupled into waveguides 1040 into two or more beams propagating in two or more waveguides 1040. The two or more beams may have substantially the same amplitude. Each waveguide 1040 may include a taper structure 1042 that may expand the beam at an end section of waveguide 1040.

A PVH 1050 may be formed on taper structure 1042 of each waveguide 1040 and may be configured to couple the light beam guided by waveguide 1040 out of waveguide 1040 towards a user's eye 1090. In some embodiments, a polarization converter, such as a waveplate, may be used between PVH 1050 and waveguide 1040. The light beam coupled out of a waveguide 1040 by a PVH 1050 may be a narrow beam that has a small divergence angle, and thus may form a glint on the user's eye. Because of the small divergence angle, light beams coupled out of waveguides 1040 by PVHs 1050 may not overlap with each other on user's eye and thus would not interfere with each other, but may form glints on different areas of the user's eye.

FIG. 10B illustrates an example of an image 1060 of a user's eye 1095 including glints 1062 according to certain embodiments. Glints 1062 may be on different areas of user's eye 1095. In some embodiment, glints 1062 may form a certain pattern, such as a circle or a 2D array on user's eye 1095. As described above, techniques such as centroiding algorithms may be used to determine the locations of the glints on the eye in the captured image. The centroiding algorithm may determine the center of the glint by finding the pixel location with the most energy in a local neighborhood. The rotational position (e.g., the gaze direction) of the eye may then be determined based on the locations of the glints relative to a known feature of the eye (e.g., the center of the pupil) within the captured image. In some embodiments, multiple images of the user's eye with glints may be captured by multiple cameras from different perspectives to provide more accurate position information or 3D profile of the user's eye.

PVHs 950 and 1050 described above are a type of Bragg grating (Q>1) that has strong polarization selectivity. A PVH may be a transmissive PVH or a reflective PVH. A PVH may include a birefringent material layer having a plurality of optically anisotropic (e.g., birefringent) molecules. For example, liquid crystal (LC) PVHs may include liquid crystal molecules that form a unique self-organized asymmetric helical structure following a two dimensional alignment pattern. Light of different polarization states (e.g., right-handed or left-handed circular polarization light or linearly polarized light) may be diffracted differently by a PVH. For example, some PVHs may only diffract incident light having the same chirality or handedness as the helical structure, and may allow incident light having the opposite chirality or handedness as the helical structure to pass through without being diffracted. The diffracted light may have the same or opposite handedness compared with the incident light. For example, some PVHs may diffract right-handed circularly polarized light into left-handed circularly polarized light, or vice versa. Some PVHs may diffract a linearly polarized or unpolarized light beam into a left-handed circularly polarized light beam that propagates in one direction and a right-handed circularly polarized light beam that propagates in another direction. PVHs can have higher refractive index modulation Δn (caused by the large birefringence of the material) than unpolarized VBGs (e.g., VBGs made of photopolymers), and thus may achieve high (e.g., nearly 100%) first-order diffraction efficiencies at large diffraction angles and can have wider angular/spectral bandwidth for incident light compared with unpolarized VBGs.

Figures 11A, 11B, 11C:
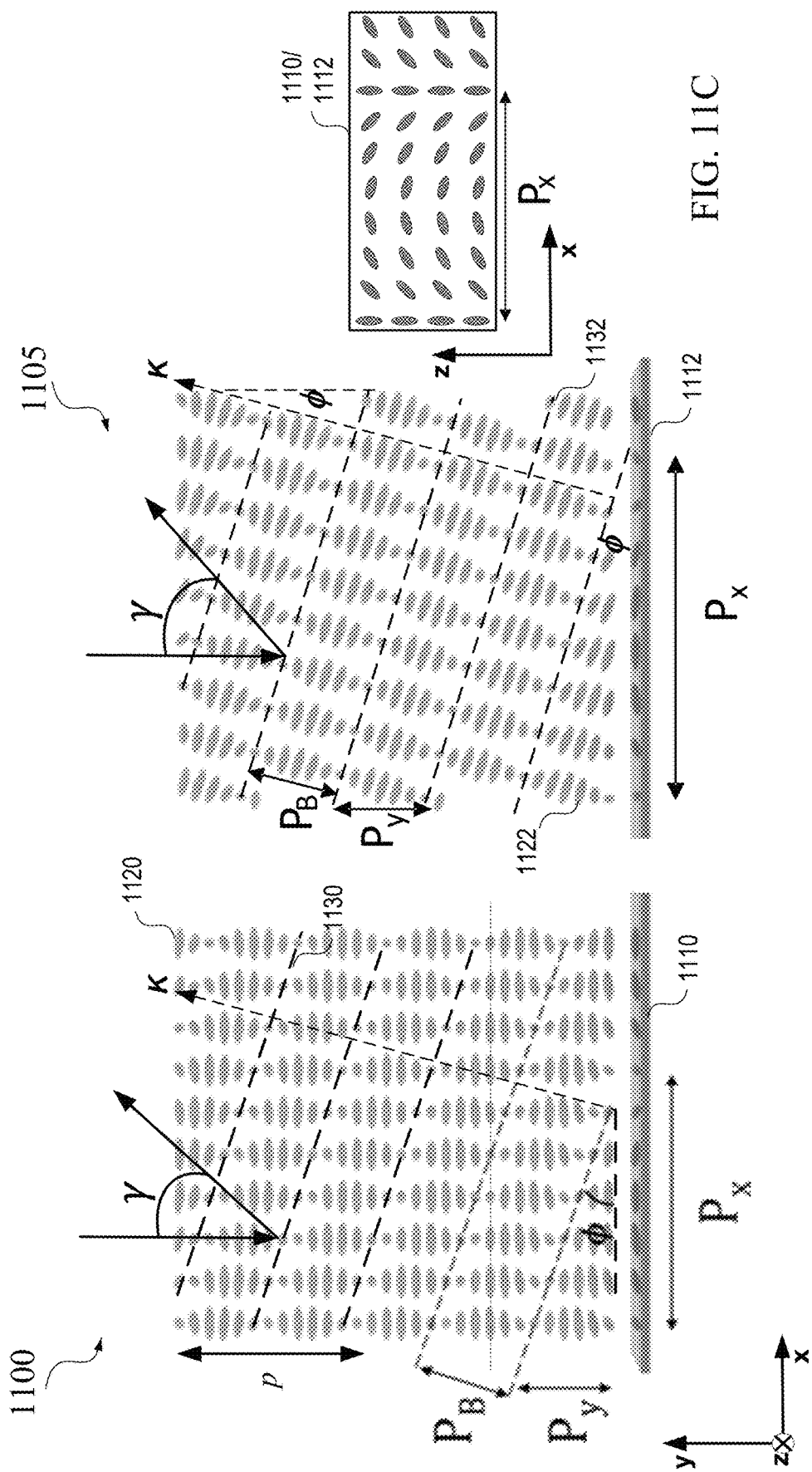
FIG. 11A illustrates an example of a polarization volume hologram in a side view.
FIG. 11B illustrates an example of a slanted polarization volume hologram in a side view.
FIG. 11C illustrates an example of a surface alignment pattern in an alignment layer of a polarization volume hologram in a top view.

FIG. 11A illustrates an example of a PVH 1100 in a side view. In the illustrated example, PVH 1100 may include a chiral dopant and birefringent material molecules 1120 (e.g., nematic liquid crystal molecules) that form a patterned helical structure on an alignment layer 1110. The liquid crystal directors may be parallel to alignment layer 1110. PVH 1100 may also include a second alignment layer (not shown in FIG. 11A) that may or may not have an alignment pattern, where the patterned helical structure including birefringent material molecules 1120 may be sandwiched by alignment layer 1110 and the second alignment layer. A helical structure along they direction may be achieved due to the doping of the chiral dopant into the birefringent material molecules (e.g., LC molecules). The periodicity $P_y$ (and pitch p) along the y axis may be tuned by controlling the helical twist power (HTP) and/or the concentration of the chiral dopant. Due to the helical twisting power of chiral dopant, the optical axis of the birefringent material (e.g., LC directors) may rotate along the helix. The birefringent material layer may need to be thick enough (e.g., about a few microns) to include several pitches in the bulk in order to operate in the Bragg regime.

Alignment layer 1110 may have a periodic surface alignment pattern. Due to the periodic surface alignment pattern, the optical axis of the birefringent material at different positions on alignment layer 1110 may rotate with different azimuthal angles in the x-z (horizontal) plane and may form a periodic structure in the horizontal plane. In contrast, in a conventional cholesteric liquid crystal (CLC) structure, a helical twist may be induced along the vertical direction while the LCs may be homogeneous in the horizontal plane. Birefringent material molecules 1120 may exhibit a helical structure that may have a periodicity perpendicular to alignment layer 1110, and may have periodical equal refractive index planes (e.g., Bragg planes 1130) having a slant angle $\phi$ with respect to alignment layer 1110. Thus, the grating vector K of PVH 1100 may have a slant angle $\phi$ with respect to the surface normal direction of alignment layer 1110. When the number of periodic refractive index planes is sufficiently high, Bragg diffraction condition may be met and PVH 1100 may reflectively or transmissively diffract incident circularly polarized light at a high efficiency to the +1st or the −1st diffraction order, depending on the slant angle $\phi$ and the handedness of the incident circularly polarized light. For example, PVH 1100 may reflectively diffract right-handed circularly polarized light to the first diffraction order at a high efficiency and may allow left-handed circularly polarized light to pass through with minimum or substantially no diffraction.

FIG. 11B illustrates an example of a slanted PVH 1105 in a side view. PVH 1105 may include an alignment layer 1112 and birefringent material molecules 1122 (e.g., liquid crystal molecules) having a helical structure that is tilted with respect to alignment layer 1112, where the liquid crystal directors may be slanted with respect to alignment layer 1110. PVH 1105 may include periodical equal refractive index planes (e.g., Bragg planes 1132) having a slant angle $\phi$ with respect to alignment layer 1112. Thus, the grating vector K of PVH 1105 may have a slant angle $\phi$ with respect to the surface-normal direction of alignment layer 1112. When the number of periodic refractive index planes is sufficiently high, Bragg diffraction condition may be met and PVH 1105 may reflectively or transmissively diffract incident circularly polarized light at a high efficiency to the +1st or the −1st order depending on the slant angle $\phi$ and the handedness of the incident circularly polarized light. For example, PVH 1105 may reflectively diffract right-handed circularly polarized light to the first diffraction order at a high efficiency and may allow left-handed circularly polarized light to pass through with minimum or substantially no diffraction. Even though not shown in FIG. 11B, PVH 1105 may also include a second alignment layer, where the patterned helical structure including birefringent material molecules 1122 may be sandwiched by alignment layer 1112 and the second alignment layer.

FIG. 11C illustrates an example of a surface alignment pattern of an alignment layer (e.g., alignment layer 1110 or 1112) in a polarization volume hologram in a top view. As illustrated, the alignment layer may be treated to rotate LC molecules or other birefringent material molecules in the x-z plane, where the rotating angle of the birefringent material molecules may change continuously and periodically along x axis with a period $P_x$. The alignment pattern may be generated using various methods. In one example, the alignment pattern may be generated by recording an interference pattern of a left-handed circularly polarized beam and a right-handed circularly polarized beam using a photopolymer. In another example, a layer of photoalignment material (PAM) including, for example, photocurable monomers, may be formed on the surface of the alignment layer and may then be exposed to an alignment light beam (e.g., a linearly polarized light beam) with a desired intensity and incident angle, where the alignment light beam may be scanned over the layer of PAM while rotating the polarization of the alignment light beam to create a cycloidal pattern in the layer of photoalignment material. After the formation of the surface alignment pattern on the alignment layer, a layer of birefringent material molecules with a chiral dopant may be applied onto the alignment layer (e.g., by spin coating) to form the helical structures. In some embodiments, the periodic helical structures of birefringent material molecules may be polymer-stabilized by mixing monomers of a stabilizing polymer into the birefringent material and curing the birefringent material to polymerize the monomers of the stabilizing polymer.

As described above, the cycloidal surface alignment pattern of the alignment layer may determine the orientation of the helical structures. The birefringent material molecules may exhibit helical structures with a period of $P_y$ (which may be one half of pitch p) along y-axis, where the slant angle $\phi$ of the slanted periodical refractive index planes may be $\phi=\pm\arctan(P_y/P_x)$ and may be determined by the alignment pattern on the alignment layer. $P_x$ may be determined based on the incident angle, the desired diffraction angle $\alpha$, the effective refractive index n of the material (e.g., n= $\sqrt{(n_e^2+2n_o^2/3)}$, and the wavelength $\lambda$ of the incident light. For example, for surface-normal incidence, Px may be determined according to $$P_x = \frac{\lambda}{n \times \sin(\alpha)},$$

the Bragg angle $\phi$ may be $\gamma/2$, and the Bragg pitch $P_B$ (or Bragg period) of the PVH may be $P_B=\lambda/2n \cos \phi$, where $$\frac{1}{P_B^2} = \frac{1}{P_x^2} + \frac{1}{P_y^2}$$

and $\gamma$ is the diffraction angle.

The optical properties of a PVH can be configured by configuring the helix twist and the properties of the Bragg planes in the PVH layer, including, for example, the slant angle of the Bragg planes, the Bragg pitch, the change of the slant angle and/or the Bragg pitch, or the like. The properties of the Bragg planes can be configured by configuring the orientation and/or the alignment of the LC molecules in the PVH layer. The effective chiral pitch p for the reflective PVHs shown in FIGS. 11A and 11B may be $$p = 2\frac{P_x^2 P_y}{P_x^2 + P_y^2} = P_B \cos\phi.$$

The wavelength band that may be reflected by the PVH may be between about $n_o p$ and about $n_e p$, where $n_o$ and $n_e$ are the ordinary refractive index and the extraordinary refractive index of the birefringent material. Within this reflection wavelength band, the diffraction efficiency to the first diffraction order may be close to 100%.

The PVHs described above with respect to FIGS. 11A and 11B may be reflective PVHs, where light of a particular circular polarization state and in a certain wavelength band may be reflectively diffracted into a first diffraction order by the PVHs. PVHs may also be made to be transmissive PVHs, where light of a particular circular polarization state may be transmissively diffracted by the PVHs. Transmissive PVHs may work for a broad wavelength band and may achieve a high diffraction efficiency at a designed working wavelength, where the diffraction efficiency may be a function of the refractive index modulation and the thickness of the transmissive PVHs. Transmissive PVHs may have different Bragg plane angles (the angle between the Bragg plane and the surface normal direction, e.g., y direction) and different LC director rotation angles (the angle between the LC director rotation plane and the surface normal direction, e.g., y direction).

FIGS. 12A-12D illustrate examples of transmissive PVHs according to certain embodiments. FIG. 12A shows an example of a primary transmissive PVH 1200 that includes an alignment layer 1210 and birefringent material molecules aligned to form a helical structure based on the alignment pattern in alignment layer 1210. Dashed lines 1220 show the Bragg planes (equal refractive index planes) and a dashed line 1230 shows the rotation plane of the birefringent material molecules (e.g., LC molecules). In primary transmissive PVH 1200, the LC directors may rotate in the x-z plane but not along the y direction, the Bragg planes may be perpendicular to alignment layer 1210 (i.e., a Bragg plane angle θ about 0°), while the rotation plane of the birefringent material molecules may be in an x-z plane parallel to alignment layer 1210 (i.e., a LC director rotation angle about 90°). Thus, primary transmissive PVH 1200 may be a vertical transmissive PVH, where the grating vector K may be parallel to alignment layer 1210 or at an angle about 90° with respect to the surface-normal direction of alignment layer 1210. Primary transmissive PVH 1200 may be a Pancharatnam-Berry phase (PBP, also referred to as geometric phase) device, and may be fabricated using, for example, the photoalignment method and/or volume exposure method described above. Primary transmissive PVH 1200 may diffract a circularly polarized light beam into a circularly polarized light beam with a phase shift. Primary transmissive PVH 1200 may perform well for smaller diffraction angle, but the diffraction efficiency may drop significantly for large diffraction angles.

FIG. 12B illustrates an example of a twisted transmissive PVH 1202 that includes an alignment layer 1212 and birefringent material molecules aligned to form a helical structure based on the alignment pattern in alignment layer 1212. Dashed lines 1222 show the Bragg planes and a dashed line 1232 shows the rotation plane of the birefringent material molecules. In twisted transmissive PVH 1202, the LC directors may rotate in the x-z plane and along the y direction, the Bragg planes may be at an angle (e.g., >45°) with respect to alignment layer 1212 (i.e., a Bragg plane angle θ between about 0° an 45°), while the rotation plane of the birefringent material molecules may be parallel to alignment layer 1212 (i.e., an LC director rotation angle about 90°). Therefore, twisted transmissive PVH 1202 may be a slanted transmissive PVH with a small slant angle (e.g., <45°) with respect to the surface-normal direction of alignment layer 1212, and thus may transmissively diffract incident light (e.g., surface-normal incident light). The Bragg pitch $P_B$ may be determined by $P_B = \lambda_0/(2n \sin \theta)$, where $\lambda_0$ is the wavelength of the incident light in free space and n is the effective refractive index of the birefringent material. The period $P_x$ along the x axis may be $P_x = \lambda_0/n \sin \alpha$, where α is the diffraction angle in the birefringent material. The period $P_y$ along the y axis may be $P_y = P_x/\tan \theta$. Twisted transmissive PVH 1202 may be able to achieve high diffraction efficiencies for large diffraction angles, but the output polarization state may be deviated from a circular polarization state. Twisted transmissive PVH 1202 may be a PBP device, and may be fabricated using, for example, the photoalignment with chiral added liquid crystal reactive mesogens and multi-layer spin coating.

FIG. 12C illustrates an example of a slanted transmissive PVH 1204 that includes an alignment layer 1214 and birefringent material molecules aligned to form a helical structure based on the alignment pattern in alignment layer 1214. Dashed lines 1224 show the Bragg planes and a dashed line 1234 shows the rotation plane of the birefringent material molecules. In slanted transmissive PVH 1204, the Bragg planes may be at an angle (e.g., >45°) with respect to alignment layer 1214 (i.e., a Bragg plane angle θ between about 0° an 45°), while the rotation plane of the birefringent material molecules may be at a non-zero angle with respect to alignment layer 1212 (e.g., an LC director rotation angle about 45° to about 90°). Thus, the rotation plane may be slanted with respect to the alignment layer (e.g., the x-z plane) and may be perpendicular to the Bragg plane. Slanted transmissive PVH 1204 may be able to achieve high diffraction efficiencies for large diffraction angles and may achieve a circular polarized state at the output. For example, slanted transmissive PVH 1204 may diffract a right-handed circularly polarized beam into a left-handed circularly polarized beam and may diffract a left-handed circularly polarized beam into a right-handed circularly polarized beam, but may diffract a linear polarized beam into a right-handed circularly polarized beam and a left-handed circularly polarized beam. Slanted transmissive PVH 1204 may be fabricated using, for example, volume exposure methods.

FIG. 12D illustrates an example of a tilted PVH 1206 that includes an alignment layer 1216 and birefringent material molecules aligned to form a helical structure based on the alignment pattern in alignment layer 1216. Dashed lines 1226 show the Bragg planes and a dashed line 1236 shows the rotation plane of the birefringent material molecules. In tilted PVH 1206, the Bragg planes may be parallel to the rotation planes of the birefringent material molecules and the rotation planes may be slanted with respect to alignment layer 1216. When the Bragg planes are at an angle greater than 45° with respect to alignment layer 1216 (i.e., a Bragg plane angle θ between about 0° and 45°) and the LC director rotation angle is between about 0° to about 45°, tilted PVH 1206 may be a tilted transmissive PVH. A tilted transmissive PVH may not achieve a high diffraction efficiency and a circular polarization state at the output. When the Bragg planes are at an angle less than about 45° with respect to alignment layer 1216 (i.e., a Bragg plane angle between about 45° and 90°) and the LC director rotation angle is between about 45° to about 90°, tilted PVH 1206 may be a tilted reflective PVH. A tilted reflective PVH may be able to achieve a high diffraction efficiency and a circular polarization state at the output. As such, tilted PVH 1206 may often be used as reflective PVH. Tilted PVH 1206 may be fabricated using, for example, the photoalignment with chiral added liquid crystal reactive mesogens.

Figure 13A:
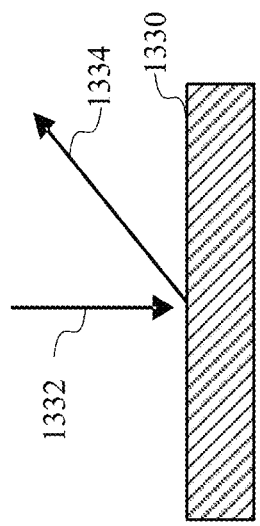
FIG. 13A illustrates an example of a transmissive polarization volume hologram.
Figure 13B:
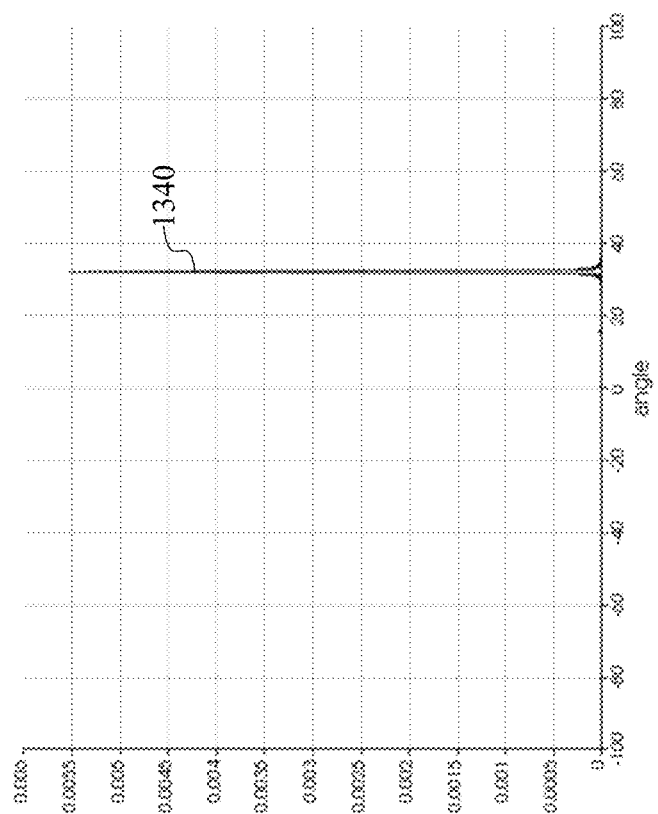
FIG. 13B illustrates the diffraction efficiency of the example of transmissive polarization volume hologram of FIG. 13A.

FIG. 13A illustrates an example of a transmissive polarization volume hologram 1310. FIG. 13B illustrates the diffraction efficiency of the example of transmissive polarization volume hologram 1310. Transmissive PVH 1310 may be an example of slanted transmissive PVH 1204. Transmissive PVH 1310 may transmissively diffract a circularly polarized incident beam 1312 into a circularly polarized diffracted beam 1314, where circularly polarized incident beam 1312 and circularly polarized diffracted beam 1314 may be on opposite sides of transmissive PVH 1310. Circularly polarized incident beam 1312 and circularly polarized diffracted beam 1314 may have opposite handedness. For example, circularly polarized incident beam 1312 may be right-handed circularly polarized, while circularly polarized diffracted beam 1314 may be left-handed circularly polarized. FIG. 13B shows that transmissive PVH 1310 may deflect incident light with a wavelength about 940 nm by a large deflection angle (e.g., about 72° in the illustrated example) at a high diffraction efficiency (e.g., close to about 90% in the illustrated example) as indicated by a pulse 1320.

Figure 13C:
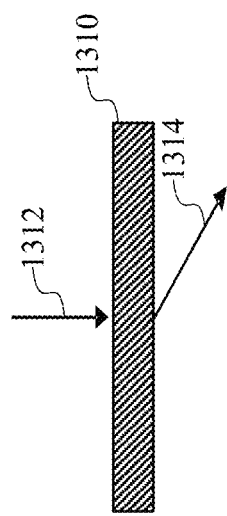
FIG. 13C illustrates an example of a reflective polarization volume hologram.
Figure 13D:
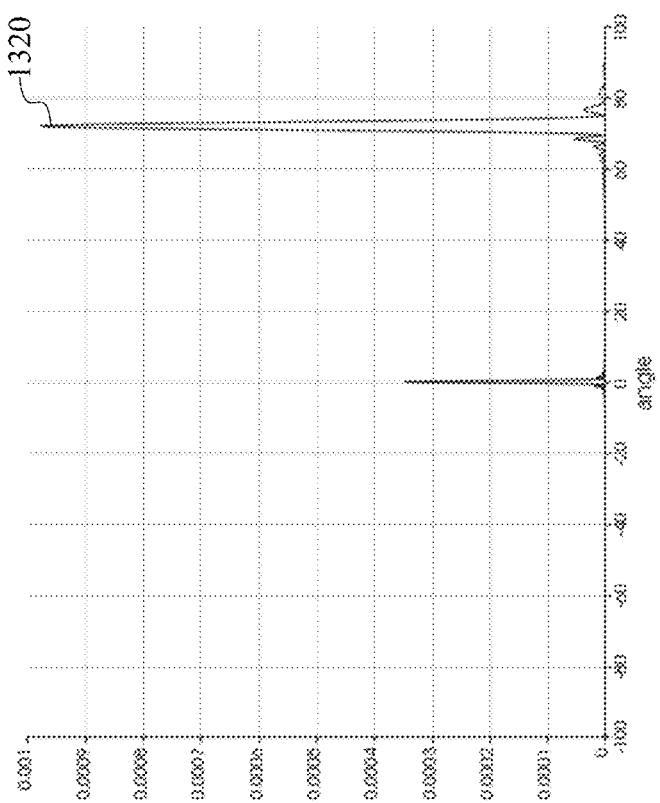
FIG. 13D illustrates the diffraction efficiency of the example of reflective polarization volume hologram of FIG. 13C.

FIG. 13C illustrates an example of a reflective polarization volume hologram 1330. FIG. 13D illustrates the diffraction efficiency of an example of reflective polarization volume hologram 1330. Reflective PVH 1330 may be an example of tilted PVH 1206 with the Bragg plane angle between about 45° and 90°. Reflective PVH 1330 may reflectively diffract a circularly polarized incident beam 1332 into a circularly polarized diffracted beam 1334, where circularly polarized incident beam 1332 and circularly polarized diffracted beam 1334 may be on the same side of reflective PVH 1330. Circularly polarized incident beam 1332 and circularly polarized diffracted beam 1334 may have opposite handedness. For example, circularly polarized incident beam 1332 may be left-handed circularly polarized, while circularly polarized diffracted beam 1334 may be right-handed circularly polarized. FIG. 13D shows that reflective PVH 1330 may deflect incident light with a wavelength about 940 nm by a large deflection angle (e.g., about 32° in the illustrated example) at a high diffraction efficiency (e.g., close to about 99%) as indicated by a pulse 1340.

Therefore, PVHs can have high diffraction efficiencies (e.g., greater than about 90% or higher) and large diffraction angles. PVHs can be easier to make than some other couplers, such as etched grating couplers. For example, PVHs may be made by spin coating liquid crystal reactive mesogens layers on a substrate with surface photoalignment or by using photo-crosslinkable liquid crystalline polymers and bulk photoalignment. Thus, it can be easier to fabricate free-form PVHs at a lower coast. PVHs may be polarization dependent and may, for example, diffract circularly polarized beams into circularly polarized beams (e.g., with opposite handedness). As such, PVHs may be suitable for coupling coherent light beams out of waveguides towards the user's eye for eye tracking.

Figure 14:
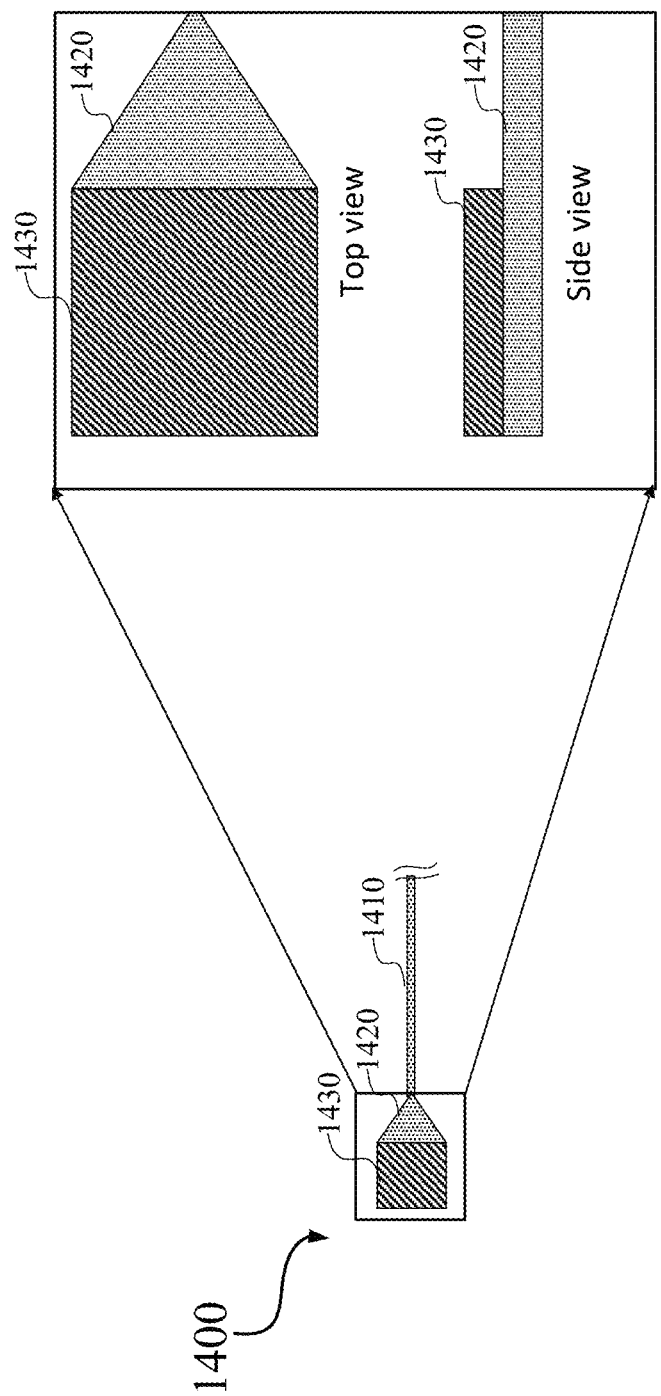
FIG. 14 illustrates an example of a structure including a transmissive polarization volume hologram for coupling light out of a waveguide according to certain embodiments.

FIG. 14 illustrates an example of a structure 1400 including a transmissive polarization volume hologram 1430 for coupling light out of a waveguide 1410 according to certain embodiments. Waveguide 1410 may be an example of waveguides 940 and 1040, and may include, for example, a core layer (e.g., a $SiO_2$ layer) and two cladding layers having lower refractive indices than the core layer. In some embodiments, at least one of the two cladding layers may be the air. Waveguide 1410 may be a single-mode waveguide or a multi-mode waveguide. In some embodiments, waveguide 1410 may include a taper structure 1420 at an end section of waveguide 1410. Taper structure 1420 may include a section with a gradually increasing width and may expand the light beam in waveguide 1410. PVH 1430 may be formed on taper structure 1420 of waveguide 1410. PVH 1430 may include, for example, primary transmissive PVH 1200, twisted transmissive PVH 1202, slanted transmissive PVH 1204, or tilted PVH 1206. PVH 1430 may have a width matching the width of the section of taper structure 1420 under PVH 1430, and may be configured to couple the light beam propagating in waveguide 1410 out of waveguide 1410.

Figure 15:
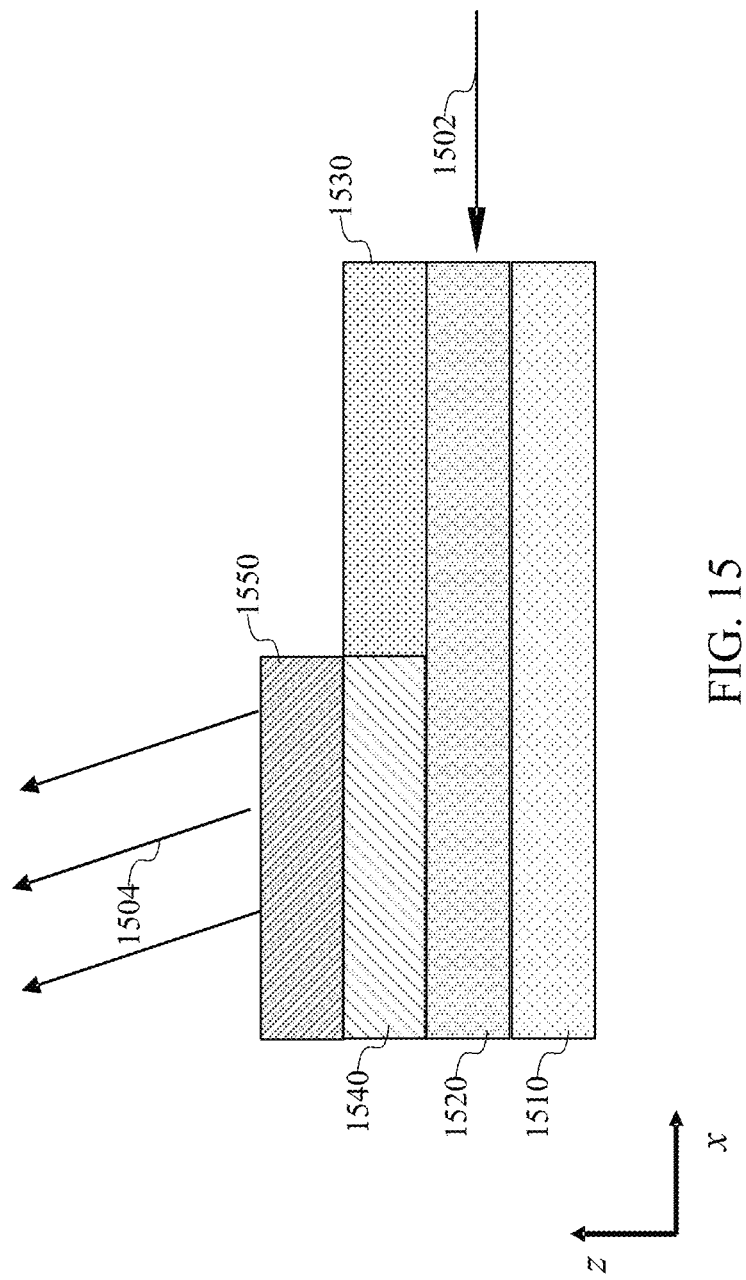
FIG. 15 includes a cross-sectional view of an example of a transmissive polarization volume hologram for coupling light out of a waveguide according to certain embodiments.

FIG. 15 includes a cross-sectional view of an example of a transmissive polarization volume hologram 1550 for coupling light out of a waveguide according to certain embodiments. Transmissive PVH 1550 may be an example of slanted transmissive PVH 1204 described above. In the illustrated example, transmissive PVH 1550 may be formed on a waveguide that includes a core layer 1520 sandwiched by two cladding layers 1510 and 1530. Core layer 1520 may have a refractive index higher than the refractive indices of cladding layers 1510 and 1530 such that a light beam 1502 may propagate within core layer 1520 through total internal reflection. In some embodiments, light beam 1502 may be linearly polarized. As described above, transmissive PVH 1550 may diffract a right-handed circularly polarized beam into a left-handed circularly polarized beam and may diffract a left-handed circularly polarized beam into a right-handed circularly polarized beam, but may diffract a linear polarized beam into a right-handed circularly polarized beam and a left-handed circularly polarized beam. Therefore, a quarter-wave plate 1540 may be positioned between core layer 1520 and transmissive PVH 1550 to convert the linearly polarized light beam into a circularly polarized light beam or convert a circularly polarized light beam into a linearly polarized light beam. Transmissive PVH 1550 may transmissively diffract the circularly polarized beam incident on transmissive PVH 1550 to couple the light beam out of the waveguide as a diffracted light beam 1504. As described above, when the incident light beam is circularly polarized, the diffracted light beam 1504 may also be circularly polarized, but may have a handedness that is opposite to the handedness of the incident light beam.

The grating equation of transmissive PVH 1550 within transmissive PVH 1550 may be:

$$\sin(\theta_{waveguide}) = \sin(\theta_{out\_PVH}) + \frac{\lambda}{n_{LC} \times p_x},$$

where $p_x$ is the grating period of transmissive PVH 1550 along the x direction, $n_{LC}$ is the refractive index of transmissive PVH 1550, $\theta_{waveguide}$ is the incident angle (e.g., the bounce angle of the guided mode in the waveguide) in transmissive PVH 1550, and $\theta_{out\_PVH}$ is the diffraction angle. The diffraction angle in air may be determined by:

$$n_{air} \sin(\theta_{out\_air}) = n_{LC} \sin(\theta_{out\_PVH}).$$

A guided mode may exist in a waveguide when a transverse resonance condition (in the z direction) is met. The transverse resonance condition may be met when a wave, after two reflections in a round trip in the z direction, has the same phase as the wave before the round trip and thus may constructively interfere with the waves after each round trip. For a certain thickness of the waveguide core and a certain wavelength, only certain discrete values of $\theta_{waveguide}$ may satisfy the resonance condition.

Figure 16:
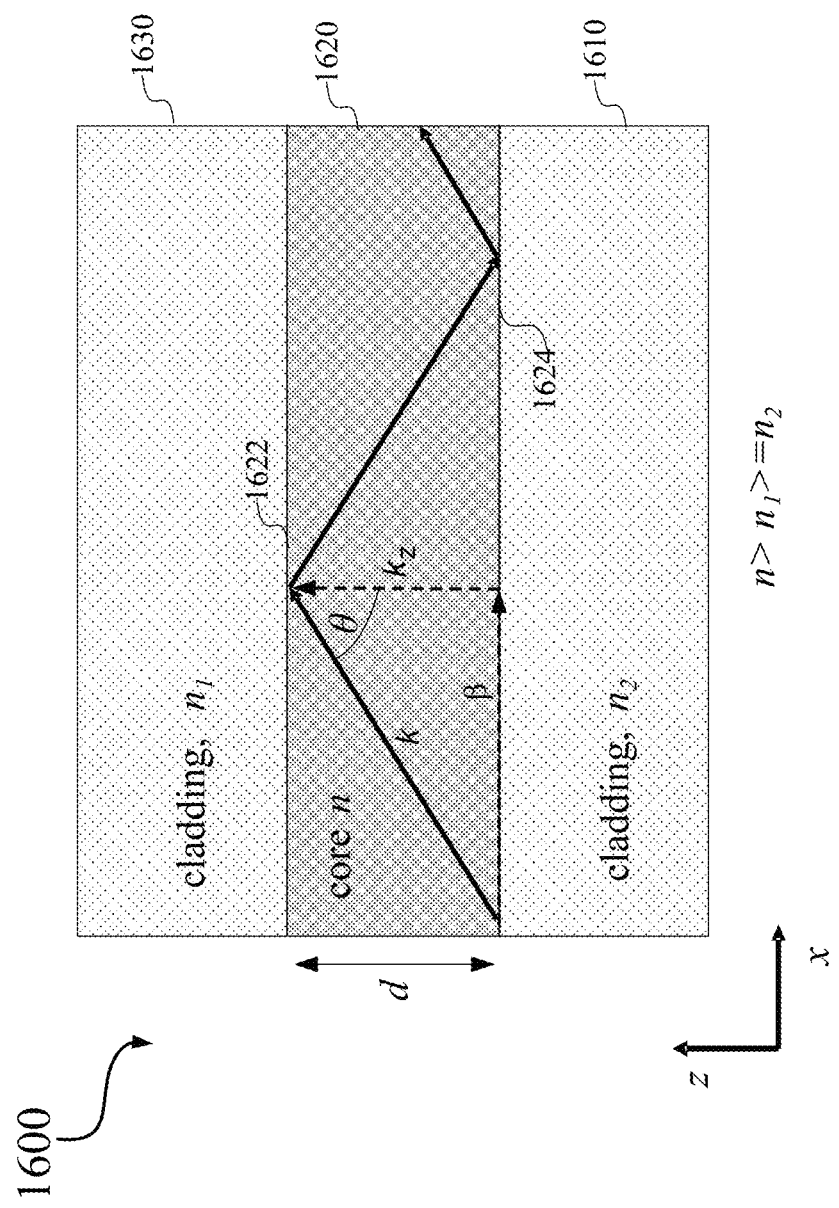
FIG. 16 illustrates a mode that may satisfy the transverse resonance condition and thus may be guided by an example of a waveguide.

FIG. 16 illustrates a mode that may satisfy the transverse resonance condition and thus may be guided by an example of a waveguide 1600. As illustrated, waveguide 1600 may include a core layer 1620 sandwiched by two cladding layers 1610 and 1630. Core layer 1620 may have a thickness d and a refractive index n, cladding layer 1630 may have a refractive index $n_1$, and cladding layer 1610 may have a refractive index $n_2$, where n may be greater than $n_1$ and $n_2$, and $n_1$ and $n_2$ may be the same or different. The guide mode may have an incidence angle θ in core layer 1620 and a wave vector k ($|k|=2\pi/\lambda$). The transverse component $k_z$ of the wave vector k may be $k_z=k\cos\theta$. The phase shift associated with the total internal reflection at an interface 1622 between core layer 1620 and cladding layer 1630 may be $\phi_1$, and the phase shift associated with the total internal reflection at an interface 1624 between core layer 1620 and cladding layer 1610 may be $\phi_2$. Phase shifts $\phi_1$ and $\phi_2$ may be determined using the Fresnel Equation. Therefore, the total phase delay of the guided mode in a transverse round trip may be:

$$2d\times k\cos\theta+\phi_1+\phi_2=m\times 2\pi, m=0,1,2,\ldots,$$

where the incidence angle θ may be greater than the critical angle $$\theta c = \sin^{-1}\frac{n_1}{n}$$

and critical angle $$\theta c = \sin^{-1}\frac{n_2}{n}.$$

Only discrete values of θ may satisfy the above equation. The number of discrete values of θ and thus the number of guided modes allowed by a waveguide may be $$\frac{2d}{\lambda}NA,$$

where $NA=\sqrt{n^2-n_1^2}$ when $n_1=n_2$. The propagation constant β of the guided mode may be determined based on the x component of the wave vector k according to:

$$\beta=k_x=nk\sin\theta.$$

Accordingly, the effective refractive index of the waveguide for the guide mode may be:

$$n_{eff}=\frac{\beta}{k}=n\sin\theta,$$

where $n_1<n_{eff}<n$.

To achieve a desired diffraction angle $\theta_{out\_PVH}$ or $\theta_{out\_air}$, the incidence angle $\theta_{waveguide}$ from the waveguide (or the bounce angle of the guided mode in the waveguide) and the grating period $p_x$ may need to be selected based on the grating equation described above. The desired incidence angle $\theta_{waveguide}$ may be achieved by selecting the thickness d of core layer 1620 based on the resonance condition described above. As described above, to achieve a large overlapped area for interference between two diffracted light beams, each diffracted light beam may need to have a certain solid angle. For the diffraction angles of the light beam diffracted by a PVH to cover the solid angle, the grating period of the PVH may not be a constant value and may have different values at different regions. For example, the grating period may vary gradually in the x direction. In some embodiments, the PVH may include multiple sublayers with different grating periods and/or different slant angles to achieve diffraction angles within a certain range to cover the solid angle.

Figure 17:
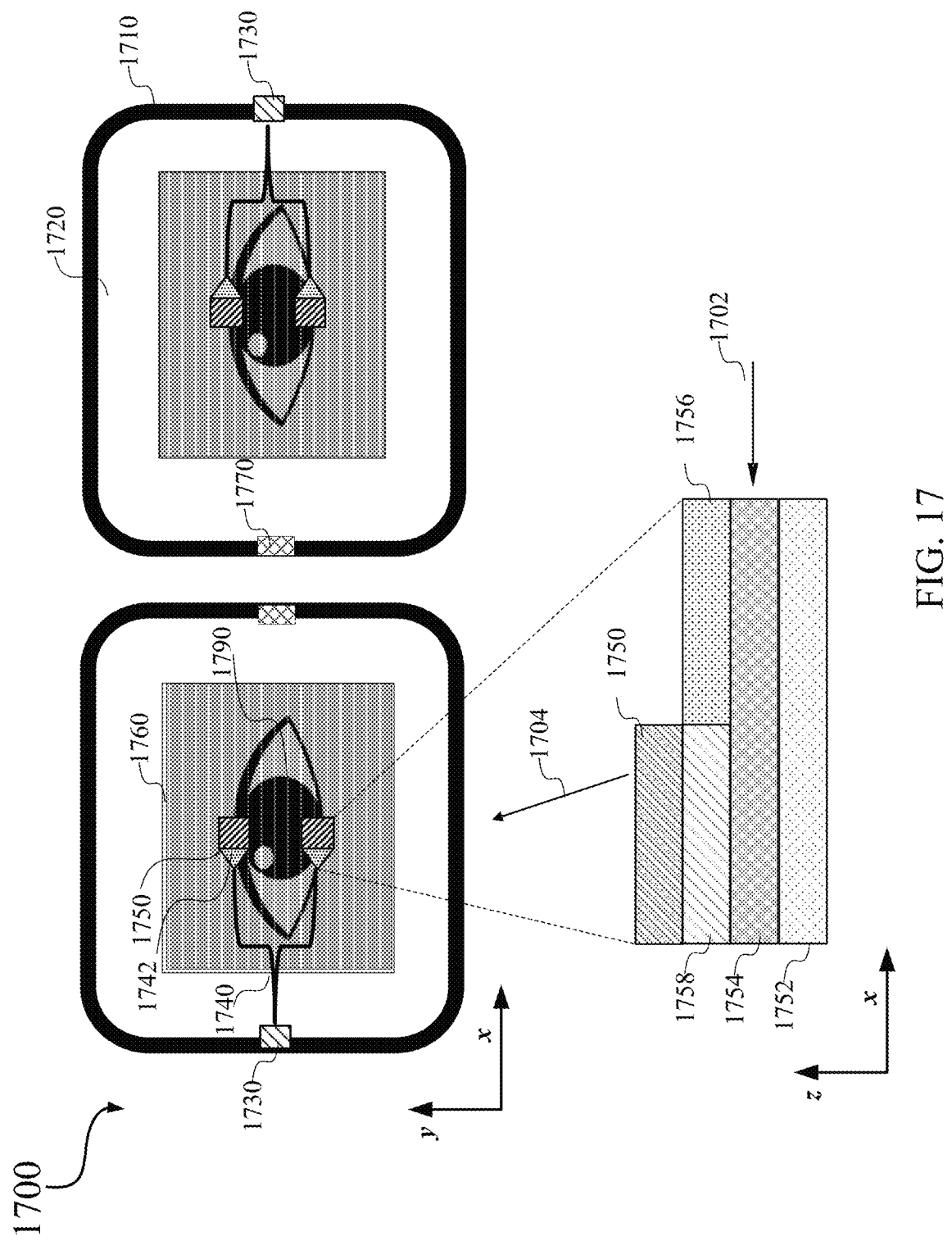
FIG. 17 illustrates an example of a near-eye display including an eye-tracking system that uses an interferometric fringe pattern generated by a pair of transmissive PVHs for three-dimensional eye tracking according to certain embodiments.

FIG. 17 illustrates an example of a near-eye display 1700 including an eye-tracking system that uses an interferometric fringe pattern 1760 generated by a pair of transmissive PVHs 1750 for three-dimensional eye tracking according to certain embodiments. Near-eye display 1700 may be an example of near-eye display 900 described above. In the illustrated example, near-eye display 1700 may include a frame 1710 and a substrate 1720 for each eye. Substrate 1720 may be held by frame 1710, and may include any suitable material, such as glass, plastic, polymer, PMMA, silica, SiC, sapphire, ceramic, crystal (such as lithium niobate or tellurium dioxide), a semiconductor material, and the like. Substrate 1720 may be transparent to visible light and IR light. Substrate 1720 may have a flat or curved broadside surface.

The eye-tracking system may include a light source 1730 that generates coherent light, such as a VECSEL, a VCSEL, a tunable laser, a quantum dot laser, an edge emitting laser, or a laser diode. Light source 1730 may emit light having a wavelength outside of the visible spectrum (e.g., between about 380 nm and about 750 nm), such as light in the IR band (e.g., between about 750 nm and about 1700 nm). Light source 1730 may be attached to frame 1710 or may be in frame 1710 or substrate 1720. Light source 1730 may be controlled by a controller, a processor, or another control system (not shown in FIG. 17) within or coupled to near-eye display 1700. Light emitted by light source 1730 may be coupled into waveguides 1740 through, for example, an edge coupler, such as an adiabatically tapered waveguide or a grating coupler. Waveguides 1740 may be formed in or on substrate 1720 and may include any suitable type of waveguides, such as buried channel waveguides, ridge waveguides, microstrip waveguides, or stripline waveguides. In some embodiments, waveguides 1740 may be single-mode waveguides. Waveguides 1740 may include one or more splitters that split the light coupled into waveguides 1740 into two or more beams propagating in two or more waveguides 1740. The two or more beams may have substantially the same amplitude. In the illustrated example, each waveguide 1740 may include a taper structure 1742 that may expand the beam at an end section of the waveguide as described above with respect to FIG. 14. Each transmissive PVH 1750 may be formed on a portion of taper structure 1742 and may be configured to couple the light beam guided by waveguide 1740 out of waveguide 1740 towards a user's eye 1790. The optical path from light source 1730 to each transmissive PVH 1750 may be substantially the same.

As illustrated in the zoom-in view of taper structure 1742 and transmissive PVH 1750, waveguides 1740 may include a core layer 1754 and cladding layers 1752 and 1756. Core layer 1754 may include, for example, $SiO_2$ or another material that is transparent to visible and IR light and has a refractive index greater than the refractive indices of cladding layers 1752 and 1756. Cladding layers 1752 and 1756 may include any suitable material that is transparent to visible light and IR light and have lower refractive indices than core layer 1754 such that a light beam 1702 may propagate within core layer 1754 through total internal reflection. In some embodiments, light beam 1702 may be linearly polarized.

Each transmissive PVH 1750 may be formed on a portion of taper structure 1742 with cladding layer 1756 removed and may have a refractive index greater than cladding layer 1756 (e.g., similar to the refractive index of core layer 1754), such that the guided light beam 1702 may enter transmissive PVH 1750 with little or no loss rather than being reflected back to core layer 1754 through total internal reflection. Transmissive PVH 1750 may have a structure as described above with respect to, for example, FIGS. 12C' and 15 and may diffract light according to the grating equation described above with respect to FIG. 15. In some embodiments, transmissive PVH 1750 may have different grating periods in different regions or may have multiple sublayers with different grating periods as described above, such that the diffraction angles of transmissive PVH 1750 may cover a certain angular range to form a light beam with a certain solid angle. Transmissive PVH 1750 may diffract a right-handed circularly polarized beam into a left-handed circularly polarized beam and may diffract a left-handed circularly polarized beam into a right-handed circularly polarized beam, but may diffract a linear polarized beam into a right-handed circularly polarized beam that propagates in one direction and a left-handed circularly polarized beam that propagates in another direction. Therefore, a quarter-wave plate 1758 may be positioned between core layer 1754 and transmissive PVH 1750 to convert the linearly polarized light beam 1702 into a circularly polarized light beam to avoid diffracting the incident light beam at two different diffraction angles. Quarter-wave plate 1758 may have a refractive index greater than cladding layer 1756 (e.g., similar to the refractive index of core layer 1754), such that the guided light beam 1702 may enter transmissive PVH 1750 rather than being reflected back to core layer 1754 through total internal reflection. Transmissive PVH 1750 may transmissively diffract the circularly polarized light beam incident on transmissive PVH 1750 to couple the light beam out of the waveguide as a diffracted light beam 1704, which may also be circularly polarized.

Two light beams 1704 coupled out of two waveguides 1740 by two transmissive PVHs 1750 and propagating towards user's eye 1790 may each have a large solid angle and thus may have a large overlapped area on user's face. The two light beams may interfere with each other in the overlapped area to form interferometric fringe pattern 1760 on the user's eye and face as described above. The distance between adjacent bright fringes or dark fringes may depend on the distance between the centers of two transmissive PVHs 1750, the wavelength of the light emitted by light source 1730, and the distance between transmissive PVHs 1750 and user's eye 1790. For example, interferometric fringe pattern 1760 may become finer and may be used to measure smaller features, when the distance between the centers of two transmissive PVHs 1750 is increased. One or more cameras 1770 may be used to capture images of user's eye 1790 and the interferometric fringe pattern distorted by user's eye 1790 from one or more perspectives. The position of user's eye 1790 may then be determined based on the captured images as described above. Even though the embodiment shown in FIG. 17 has a pair of transmissive PVHs 1750 arranged along the y direction to generate a set of horizontal fringes (extending along the x direction), in another embodiments, near-eye display 1700 may include, additionally or alternatively, a pair of PVHs arranged along the x direction to generate a set of vertical fringes (extending in the y direction).

Figure 18:
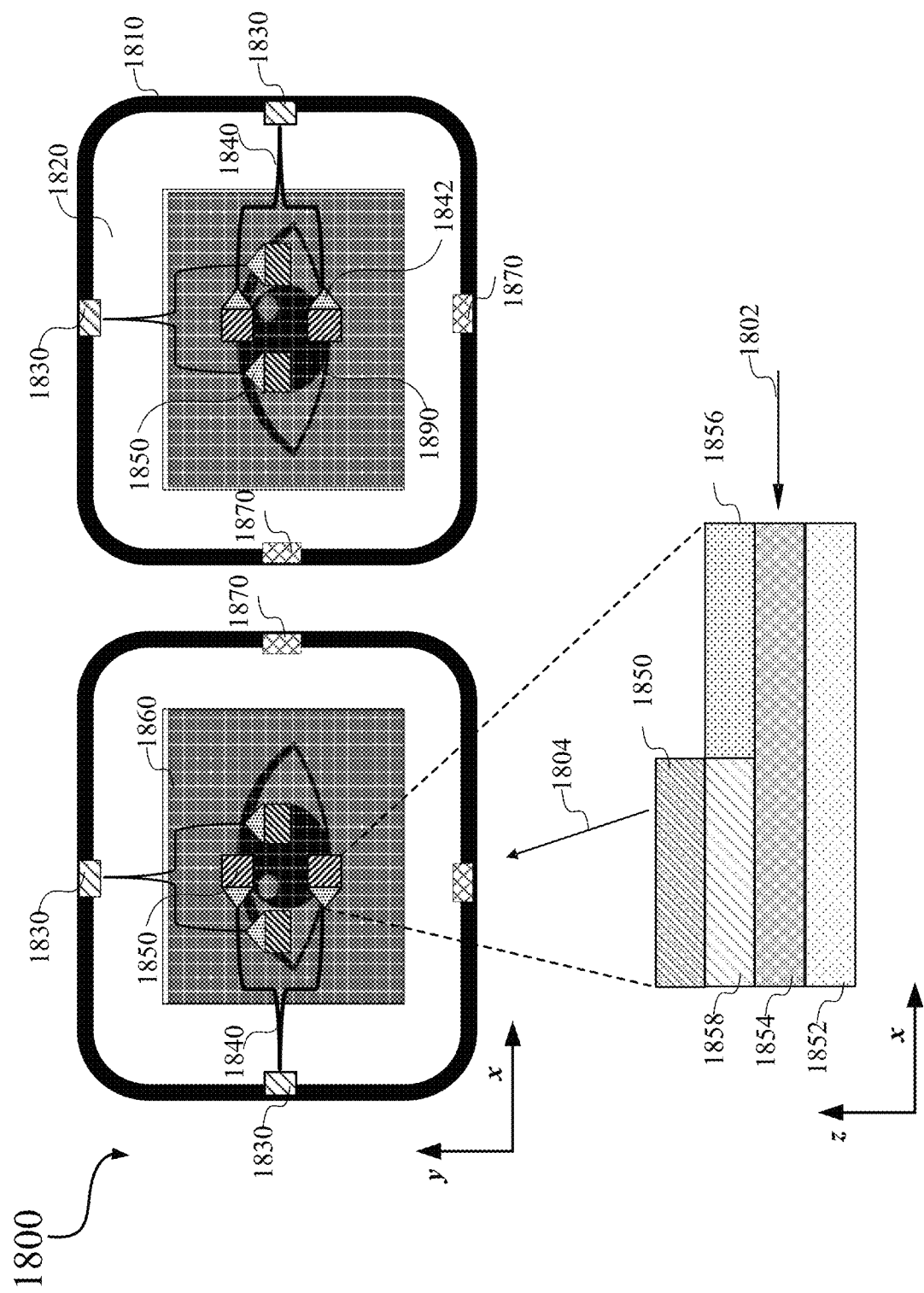
FIG. 18 illustrates an example of a near-eye display including an eye-tracking system that uses an interferometric fringe pattern generated by multiple pairs of transmissive PVHs for three-dimensional eye tracking according to certain embodiments.

FIG. 18 illustrates an example of a near-eye display 1800 including an eye-tracking system that uses an interferometric fringe pattern 1860 generated by multiple pairs of transmissive PVHs 1850 for three-dimensional eye tracking according to certain embodiments. Near-eye display 1800 may be another example of near-eye display 900 described above. In the illustrated example, near-eye display 1800 may include a frame 1810 and a substrate 1820 for each eye. Substrate 1820 may be held by frame 1810, and may include any suitable material, such as glass, plastic, polymer, PMMA, silica, sapphire, SiC, ceramic, crystal (such as lithium niobate or tellurium dioxide), a semiconductor material, and the like. Substrate 1820 may be transparent to visible light and IR light. Substrate 1820 may have a flat or curved broadside surface.

The eye-tracking system may include two or more light sources 1830 that generate coherent light. Light sources 1830 may include, for example, a VECSEL, a VCSEL, a tunable laser, a quantum dot laser, an edge emitting laser, or a laser diode. Light sources 1830 may emit light having a wavelength outside of the visible spectrum (e.g., between about 380 nm and about 750 nm), such as light in the IR band (e.g., between about 750 nm and about 1700 nm). Light sources 1830 may be attached to frame 1810 or may be in frame 1810 or substrate 1820. Light sources 1830 may be controlled by a controller, a processor, or another control system (not shown in FIG. 18) within or coupled to near-eye display 1800. Light emitted by each light source 1830 may be coupled to waveguides 1840 through, for example, an edge coupler such as an adiabatically tapered waveguide or a grating coupler. Waveguides 1840 may be formed in or on substrate 1820 and may include any suitable type of waveguides, such as buried channel waveguides, ridge waveguides, microstrip waveguides, or stripline waveguides. In some embodiments, waveguides 1840 may be single-mode waveguides. Waveguides 1840 may include one or more splitters that split the light coupled into waveguides 1840 into two or more beams propagating in two or more waveguides 1840. The two or more beams may have substantially the same amplitude and/or phase. As described above, each waveguide 1840 may include a taper structure 1842 that may expand the beam at an end section of the waveguide as described above with respect to FIG. 14. Each transmissive PVH 1850 may be formed on a portion of taper structure 1842 and may be configured to couple the light beam guided by waveguide 1840 out of waveguide 1840 towards a user's eye 1890.

As illustrated in the zoom-in view of taper structure 1842 and transmissive PVH 1850, waveguides 1840 may include a core layer 1854 and cladding layers 1852 and 1856. Core layer 1854 may include, for example, $SiO_2$ or another material that is transparent to visible and IR light and has a refractive index greater than the refractive indices of cladding layers 1852 and 1856. Cladding layers 1852 and 1856 may include any suitable material that is transparent to visible light and IR light and have lower refractive indices than core layer 1854 such that a light beam 1802 may propagate within core layer 1854 through total internal reflection. In some embodiments, light beam 1802 may be linearly polarized.

Each transmissive PVH 1850 may be formed on a portion of taper structure 1842 with cladding layer 1856 removed and may have a refractive index greater than cladding layer 1856 (e.g., similar to the refractive index of core layer 1854), such that the guided light beam 1802 may enter transmissive PVH 1850 with little or no loss rather than being reflected back to core layer 1854 through total internal reflection. Transmissive PVH 1850 may have a structure as described above with respect to, for example, FIGS. 12C and 15, and may diffract light according to the grating equation described above with respect to FIG. 15. In some embodiments, transmissive PVH 1850 may have different grating periods in different regions or may include multiple sublayers with different grating periods as described above, such that the diffraction angles of transmissive PVH 1850 may cover a certain angular range to form a light beam with a certain solid angle. Transmissive PVH 1850 may diffract a right-handed circularly polarized beam into a left-handed circularly polarized beam and may diffract a left-handed circularly polarized beam into a right-handed circularly polarized beam, but may diffract a linear polarized beam into a right-handed circularly polarized beam that propagates in one direction and a left-handed circularly polarized beam that propagates in another direction. Therefore, a quarter-wave plate 1858 may be positioned between core layer 1854 and transmissive PVH 1850 to convert the linearly polarized light beam 1802 into a circularly polarized light beam to avoid diffracting the incident light beam at two different diffraction angles. Quarter-wave plate 1858 may have a refractive index greater than cladding layer 1856 (e.g., similar to the refractive index of core layer 1854), such that the guided light beam 1802 may enter transmissive PVH 1850 rather than being reflected back to core layer 1854 through total internal reflection. Transmissive PVH 1850 may transmissively diffract the circularly polarized beam incident on transmissive PVH 1850 to couple the light beam out of the waveguide as a diffracted light beam 1804. Light beam 1804 may be circularly polarized.

A pair of light beams 1804 from a same light source 1830 and coupled out of two waveguides 1840 towards user's eye 1890 by two transmissive PVHs 1850 may each have a large solid angle and thus a large overlapped area on user's face. The pair of light beams may interfere with each other in the overlapped area to form a set of fringes on the user's eye and face as described above. For example, a pair of light beams diffracted by a pair of transmissive PVHs 1850 arranged along the x direction may generate a set of fringes each extending along the y direction (i.e., vertical fringes), whereas a pair of light beams diffracted by a pair of transmissive PVHs 1850 arranged along the y direction may generate a set of fringes each extending along the x direction (i.e., horizontal fringes). The two sets of fringes may form a crossed pattern on user's eye and face. Light beams from different light sources 1830 may not be coherent and thus may not interfere even if they overlap on user's eye. The distance between adjacent bright fringes or dark fringes in each set of fringes may depend on the distance between the centers of two transmissive PVHs 1850, the wavelength of the light emitted by light source 1830, and the distance between transmissive PVHs 1850 and user's eye 1890. For example, interferometric fringe pattern 1860 may become finer and may be used to measure smaller features, when the distance between the centers of two transmissive PVHs 1850 is increased. In some embodiments, two or more pairs of PVHs arranged along a first direction (e.g., x direction) may have different distances between the two PVHs in each pair, and thus may generate two or more sets of fringes each extending in a second direction (e.g., y direction) orthogonal to the first direction, where the periods of the two sets of fringes may be different. One or more cameras 1870 may be used to capture images of user's eye 1890 and the interferometric fringe pattern distorted by user's eye 1890 from one or more perspectives. The position of user's eye 1890 may then be determined based on the captured images as described above.

Figure 19:
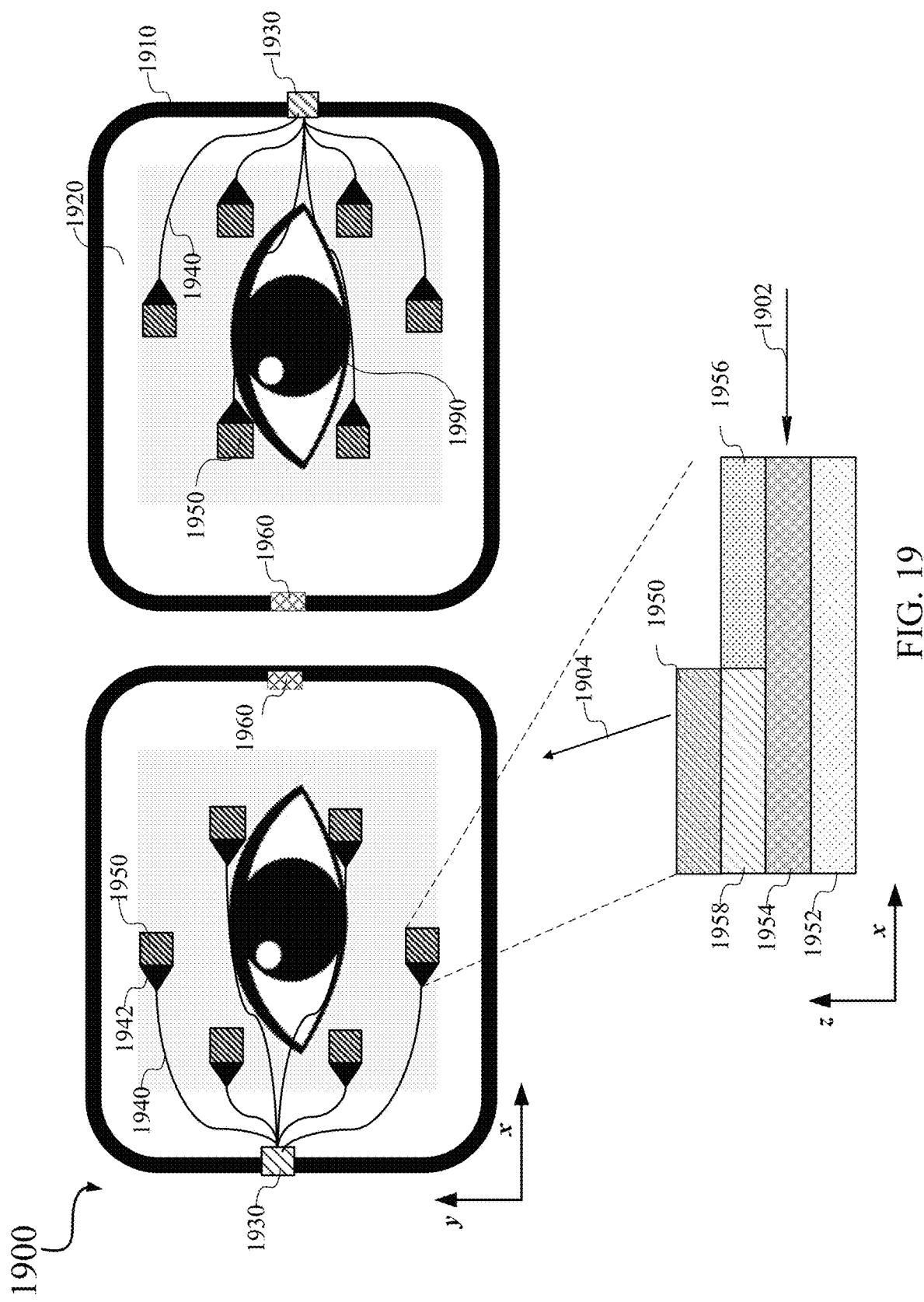
FIG. 19 illustrates an example of a near-eye display including an eye-tracking system that uses glints generated by a plurality of PVHs for eye tracking according to certain embodiments.

FIG. 19 illustrates an example of a near-eye display 1900 including an eye-tracking system that uses glints generated by a plurality of PVHs 1950 for eye tracking according to certain embodiments. Near-eye display 1900 may be an example of near-eye display 1000 described above. The eye-tracking system in near-eye display 1900 may include a frame 1910 and a substrate 1920 for each eye. Substrate 1920 may be held by frame 1910, and may include any suitable material, such as glass, plastic, polymer, PMMA, silica, sapphire, SiC, ceramic, crystal (such as lithium niobate or tellurium dioxide), a semiconductor material, and the like. Substrate 1920 may be transparent to visible light and IR light. Substrate 1920 may have a flat or curved broadside surface.

The eye-tracking system may include one or more light sources 1930. Each light source 1930 may generate coherent or noncoherent light, and may include, for example, an LED, a micro-LED, a resonant cavity micro-LED, a VECSEL, a VCSEL, an SLED, a tunable laser, a quantum dot laser, an edge emitting laser, or a laser diode. Light source 1930 may emit light with wavelengths outside of the visible spectrum (e.g., between about 380 nm and about 750 nm). For example, light source 1930 may emit light in the IR band (e.g., between about 750 nm and about 1700 nm). Light source 1930 may be attached to frame 1910 or may be in frame 1910 or substrate 1920. Light source 1930 may be controlled by a controller, a processor, or another control system (not shown in FIG. 19) within or coupled to near-eye display 1900.

Light emitted by a light source 1930 may be coupled into waveguides 1940 through, for example, an edge coupler such as an adiabatically tapered waveguide or a grating coupler. Waveguides 1940 may be formed in or on substrate 1920 and may include any suitable type of waveguides, such as buried channel waveguides, ridge waveguides, microstrip waveguides, or stripline waveguides. Waveguides 1940 may be single-mode waveguides or multi-mode waveguides. Waveguides 1940 may include one or more splitters that split the light coupled into waveguides 1940 into two or more beams propagating in two or more waveguides 1940. The two or more beams may have substantially the same amplitude. Each waveguide 1940 may include a taper structure 1942 that may expand the beam at an end section of the waveguide as described above with respect to FIG. 14.

As illustrated in the zoom-in view of taper structure 1942 and transmissive PVH 1950, waveguides 1940 may include a core layer 1954 and cladding layers 1952 and 1956. Core layer 1954 may include, for example, $SiO_2$ or another material that is transparent to visible and IR light and has a refractive index greater than the refractive indices of cladding layers 1952 and 1956. Cladding layers 1952 and 1956 may include any suitable material that is transparent to visible light and IR light and have lower refractive indices than core layer 1954 such that a light beam 1902 may propagate within core layer 1954 through total internal reflection. In some embodiments, light beam 1902 may be linearly polarized.

Each PVH 1950 may be formed on a portion of taper structure 1942 with cladding layer 1956 removed and may have a refractive index greater than cladding layer 1956 (e.g., similar to the refractive index of core layer 1954), such that the guided light beam 1902 may enter PVH 1950 with little or no loss rather than being reflected back to core layer

1954 through total internal reflection. The plurality of PVHs 1950 may be arranged according to a two-dimensional pattern, such as one or more circles, a grid, a polygon, and the like. Each PVH 1950 may have a structure as described above with respect to, for example, FIGS. 11A-12D and 15 and may diffract light according to the grating equation described above with respect to FIG. 15. PVH 1950 may diffract a right-handed circularly polarized beam into a left-handed circularly polarized beam and may diffract a left-handed circularly polarized beam into a right-handed circularly polarized beam, but may diffract a linear polarized beam into a right-handed circularly polarized beam that propagates in one direction and a left-handed circularly polarized beam that propagates in another direction. Therefore, a quarter-wave plate 1958 may be positioned between core layer 1954 and transmissive PVH 1950 to convert the linearly polarized light beam 1902 into a circularly polarized light beam to avoid diffracting the incident light beam at two different diffraction angles. Quarter-wave plate 1958 may have a refractive index greater than cladding layer 1956 (e.g., similar to the refractive index of core layer 1954), such that the guided light beam 1902 may enter transmissive PVH 1950 rather than being reflected back to core layer 1954 through total internal reflection. Transmissive PVH 1950 may transmissively diffract the circularly polarized beam incident on transmissive PVH 1950 to couple the light beam out of the waveguide as a diffracted light beam 1904.

Each PVH 1950 in near-eye display 1900 may have a respective uniform grating period determined based on the grating equation described above and the desired diffraction angle. Thus, a light beam 1904 coupled out of a waveguide 1940 by a PVH 1950 may be a narrow beam that has a very small divergence angle. Because of the small divergence angle, light beams coupled out of waveguides 1940 by PVHs 1950 may not overlap with each other on user's eye and thus may not interfere with each other, but may form glints on different areas of the user's eye, where the glints on the user's eye may form a pattern. One or more cameras 1960 may be used to capture images of user's eye 1990 and the interferometric fringe pattern distorted by user's eye 1990 from one or more perspectives. The position of user's eye 1990 may then be determined based on the captured images as described above. A smaller glint size in the captured image may lead to a more precise glint location determination and more accurate eye-tracking.

Even though the PVHs described above with respect to FIGS. 15 and 17-19 are transmissive PVHs, reflective PVHs as described above with respect to FIGS. 11A-12D and 13C may also be used in the eye-tracking systems of the near-eye displays described above. For example, the reflective PVHs may be below the core of the waveguide and may diffractively reflect incident light from the core of the waveguide back to the core at an angle such that the diffractively reflected light may not meet the total internal reflection condition in the waveguide and thus may be refracted out of the waveguide. In some embodiments, a polarization converter (e.g., a waveplate) may be between the core of the waveguide and the reflective PVH to change the polarization state of the light. For example, the polarization converter may convert linearly polarized incident light from the core of the waveguide into circularly polarized light incident on the reflective PVH, and may convert circularly polarized light reflected by the reflective PVH into linearly polarized light incident on the core of the waveguide. The polarization volume holograms describe above may also be used as input couplers for coupling light into the waveguide.

Figure 20:
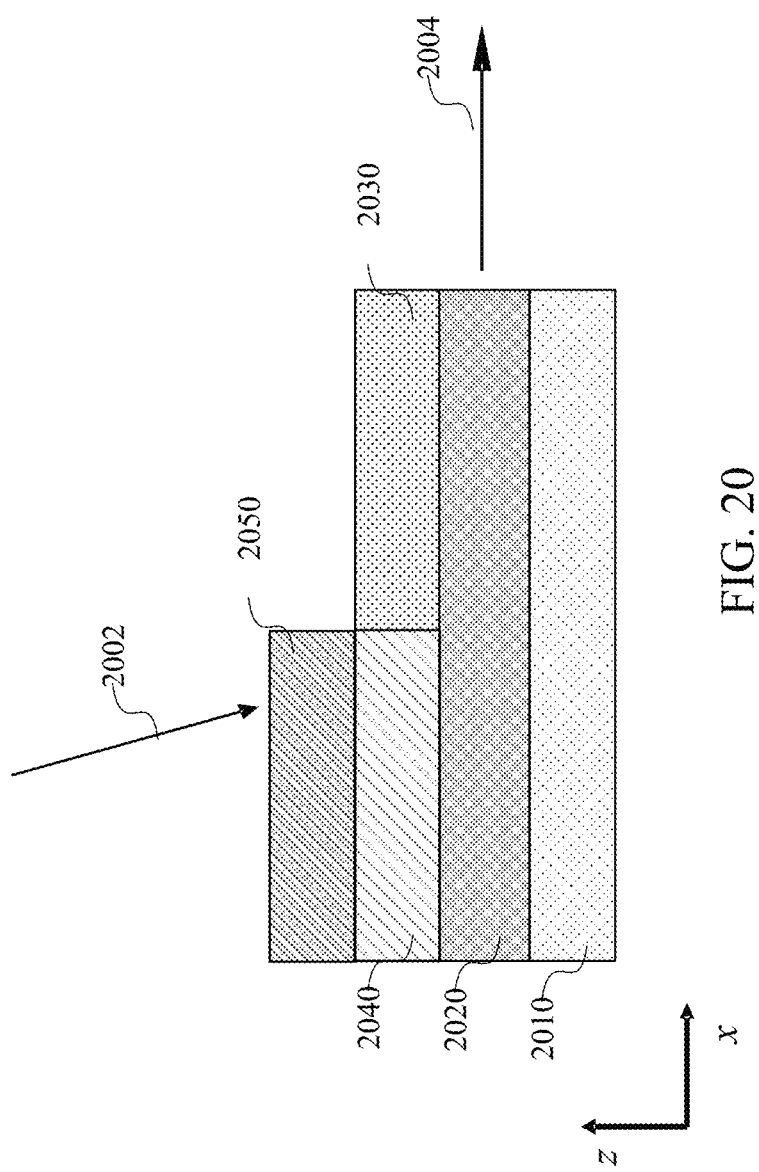
FIG. 20 illustrates an example of a transmissive polarization volume hologram for coupling light into a waveguide according to certain embodiments.

FIG. 20 illustrates an example of a transmissive polarization volume hologram for coupling light into a waveguide according to certain embodiments. The structure shown in FIG. 20 may be similar to the structure shown in FIG. 15, but may be used as an input coupler for coupling external light into a waveguide. In the illustrated example, a transmissive PVH 2050 may be formed on a waveguide that includes a core layer 2020 sandwiched by two cladding layers 2010 and 2030. Core layer 2020 may have a refractive index higher than the refractive indices of cladding layers 2010 and 2030. Transmissive PVH 2050 may diffract an incident light beam 2002 into core layer 2020 at a certain diffraction angle such that a light beam 2004 coupled into core layer 2020 may propagate within core layer 2020 through total internal reflection. As described above, transmissive PVH 2050 may diffract a right-handed circularly polarized beam into a left-handed circularly polarized beam and may diffract a left-handed circularly polarized beam into a right-handed circularly polarized beam, but may diffract a linear polarized beam into a right-handed circularly polarized beam and a left-handed circularly polarized beam. In the illustrated example, incident light beam 2002 may be circularly polarized. Therefore, the diffracted light beam may also be circularly polarized. In some embodiments, a quarter-wave plate 2040 may be positioned between core layer 2020 and transmissive PVH 2050 to convert the circularly polarized light beam into a linearly polarized light beam such that light beam 2004 guided in the waveguide may be linearly polarized.

The grating equation of the transmissive grating within transmissive PVH 2050 may be:

$$\sin(\theta_{in\_PVH}) = \sin(\theta_{waveguide}) + \frac{\lambda}{n_{LC} \times p_x},$$

where $p_x$ is the grating period of transmissive PVH 2050 along the x direction, $n_{LC}$ is the refractive index of transmissive PVH 2050, $\theta_{waveguide}$ is the bounce angle of the guided mode in the waveguide, and $\theta_{in\_PVH}$ is the incident angle of incident light beam 2002 within transmissive PVH 2050. The incident angle $\theta_{in\_air}$ of incident light beam 2002 in air may be determined by:

$$n_{air} \sin(\theta_{in\_air}) = n_{LC} \sin(\theta_{in\_PVH}).$$

For a transmissive PVH with a uniform grating period $p_x$, $\theta_{waveguide}$ and $\theta_{in-air}$ (and $\theta_{in\_PVH}$) may be fixed, and thus the transmissive PVH may only receive incident light from a specific direction $\theta_{in-air}$. To receive incident light within a certain field of view, the transmissive PVH may have different grating periods in different regions or in different layers.

Figure 21A:
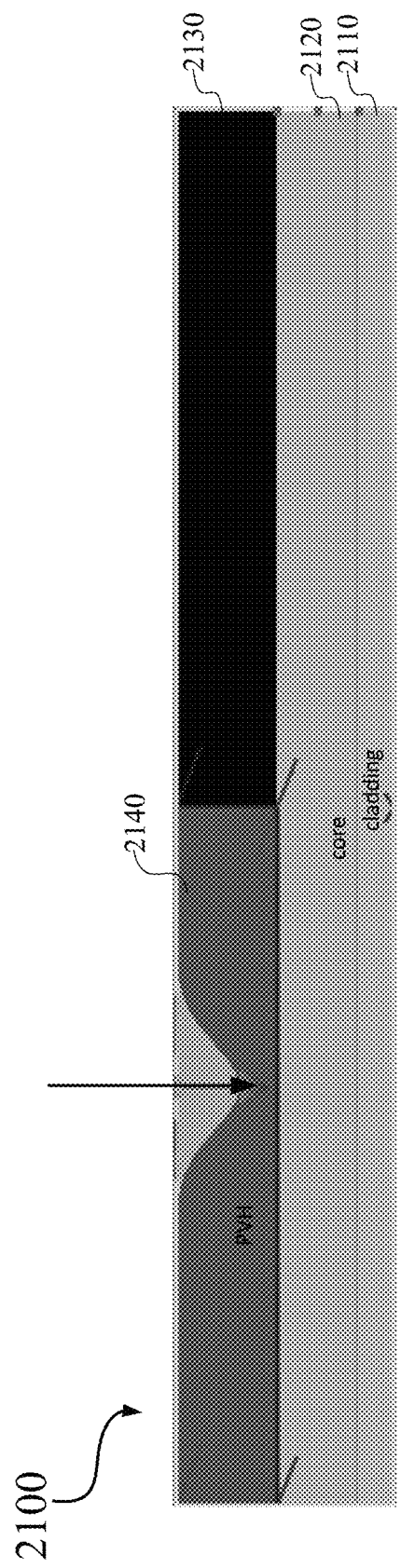
FIG. 21A illustrates an example of a model for Finite-Difference Time-Domain (FDTD) simulation of a transmissive polarization volume hologram according to certain embodiments.

FIG. 21A illustrates an example of a model 2100 for Finite-Difference Time-Domain (FDTD) simulation of a transmissive polarization volume hologram according to certain embodiments. Model 2100 may simulate an example of the structure shown in FIG. 20. In the illustrated example, model 2100 includes a PVH 2140 and a waveguide formed by a core layer 2120, a bottom cladding layer 2110, and a top cladding layer 2130. PVH 2140 may be an example of transmissive PVH 2050 described above. Core layer 2120, bottom cladding layer 2110, and top cladding layer 2130 may be examples of core layer 2020 and cladding layers 2010 and 2030, respectively, and thus are not described in detail herein.

Figure 21B:
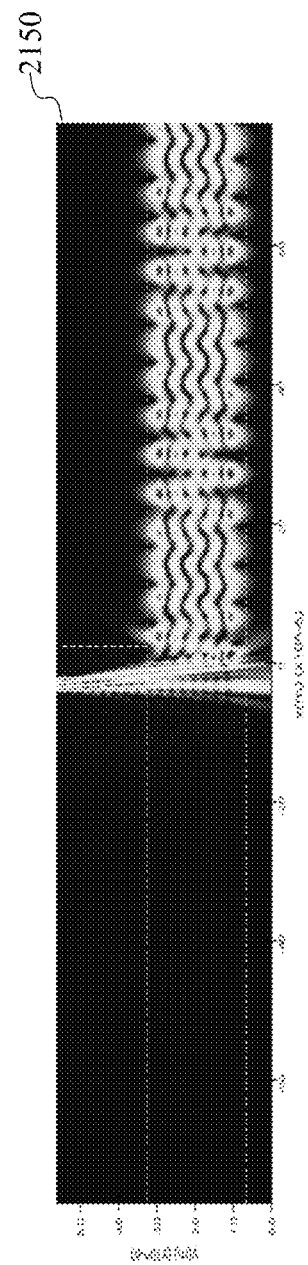
FIG. 21B includes a diagram illustrating FDTD simulation results using the model shown in FIG. 21A.

FIG. 21B includes a diagram 2150 illustrating FDTD simulation results using model 2100 shown in FIG. 21A.

FIG. 21B shows that a majority of the light beam incident on PVH 2140 is diffracted into core layer 2120 at certain directions and the diffracted light may propagate within core layer 2120 through total internal reflection. A small portion of the light beam incident on PVH 2140 may not be diffracted by PVH 2140 and may pass through the waveguide because the diffraction efficiency of PVH 2140 is less than 100%.

Embodiments of the invention may be used to fabricate components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 22:
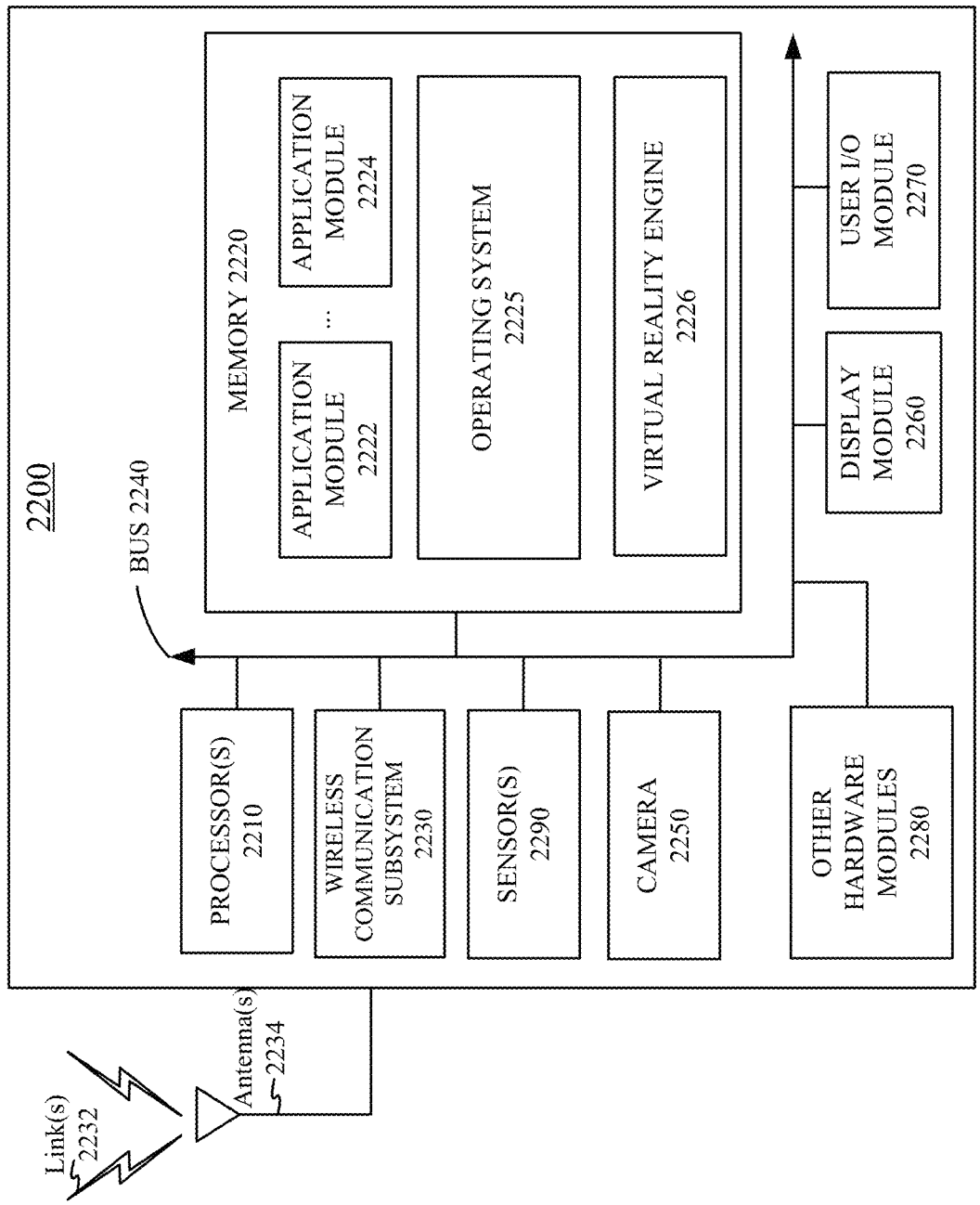
FIG. 22 is a simplified block diagram of an example of an electronic system 2200 of a near-eye display system (e.g., HMD device) for implementing some of the examples disclosed herein according to certain embodiments.

FIG. 22 is a simplified block diagram of an example of an electronic system 2200 of a near-eye display system (e.g., HMD device) for implementing some of the examples disclosed herein. Electronic system 2200 may be used as the electronic system of an HMD device or other near-eye displays described above. In this example, electronic system 2200 may include one or more processor(s) 2210 and a memory 2220. Processor(s) 2210 may be configured to execute instructions for performing operations at a number of components, and can be, for example, a general-purpose processor or microprocessor suitable for implementation within a portable electronic device. Processor(s) 2210 may be communicatively coupled with a plurality of components within electronic system 2200. To realize this communicative coupling, processor(s) 2210 may communicate with the other illustrated components across a bus 2240. Bus 2240 may be any subsystem adapted to transfer data within electronic system 2200. Bus 2240 may include a plurality of computer buses and additional circuitry to transfer data.

Memory 2220 may be coupled to processor(s) 2210. In some embodiments, memory 2220 may offer both short-term and long-term storage and may be divided into several units. Memory 2220 may be volatile, such as static random access memory (SRAM) and/or dynamic random access memory (DRAM) and/or non-volatile, such as read-only memory (ROM), flash memory, and the like. Furthermore, memory 2220 may include removable storage devices, such as secure digital (SD) cards. Memory 2220 may provide storage of computer-readable instructions, data structures, program modules, and other data for electronic system 2200. In some embodiments, memory 2220 may be distributed into different hardware modules. A set of instructions and/or code might be stored on memory 2220. The instructions might take the form of executable code that may be executable by electronic system 2200, and/or might take the form of source and/or installable code, which, upon compilation and/or installation on electronic system 2200 (e.g., using any of a variety of generally available compilers, installation programs, compression/decompression utilities, etc.), may take the form of executable code.

In some embodiments, memory 2220 may store a plurality of application modules 2222 through 2224, which may include any number of applications. Examples of applications may include gaming applications, conferencing applications, video playback applications, or other suitable applications. The applications may include a depth sensing function or eye-tracking function. Application modules 2222-2224 may include particular instructions to be executed by processor(s) 2210. In some embodiments, certain applications or parts of application modules 2222-2224 may be executable by other hardware modules 2280. In certain embodiments, memory 2220 may additionally include secure memory, which may include additional security controls to prevent copying or other unauthorized access to secure information.

In some embodiments, memory 2220 may include an operating system 2225 loaded therein. Operating system 2225 may be operable to initiate the execution of the instructions provided by application modules 2222-2224 and/or manage other hardware modules 2280 as well as interfaces with a wireless communication subsystem 2230 which may include one or more wireless transceivers. Operating system 2225 may be adapted to perform other operations across the components of electronic system 2200 including threading, resource management, data storage control and other similar functionality.

Wireless communication subsystem 2230 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2200 may include one or more antennas 2234 for wireless communication as part of wireless communication subsystem 2230 or as a separate component coupled to any portion of the system. Depending on desired functionality, wireless communication subsystem 2230 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2230 may permit data to be exchanged with a network, other computer systems, and/or any other devices described herein. Wireless communication subsystem 2230 may include a means for transmitting or receiving data, such as identifiers of HMD devices, position data, a geographic map, a heat map, photos, or videos, using antenna(s) 2234 and wireless link(s) 2232. Wireless communication subsystem 2230, processor(s) 2210, and memory 2220 may together comprise at least a part of one or more of a means for performing some functions disclosed herein.

Embodiments of electronic system 2200 may also include one or more sensors 2290. Sensor(s) 2290 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2290 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2200 may include a display module 2260. Display module 2260 may be a near-eye display, and may graphically present information, such as images, videos, and various instructions, from electronic system 2200 to a user. Such information may be derived from one or more application modules 2222-2224, virtual reality engine 2226, one or more other hardware modules 2280, a combination thereof, or any other suitable means for resolving graphical content for the user (e.g., by operating system 2225). Display module 2260 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 2200 may include a user input/output module 2270. User input/output module 2270 may allow a user to send action requests to electronic system 2200. An action request may be a request to perform a particular action. For example, an action request may be to start or end an application or to perform a particular action within the application. User input/output module 2270 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2200. In some embodiments, user input/output module 2270 may provide haptic feedback to the user in accordance with instructions received from electronic system 2200. For example, the haptic feedback may be provided when an action request is received or has been performed.

Electronic system 2200 may include a camera 2250 that may be used to take photos or videos of a user, for example, for tracking the user's eye position. Camera 2250 may also be used to take photos or videos of the environment, for example, for VR, AR, or MR applications. Camera 2250 may include, for example, a complementary metal-oxide-semiconductor (CMOS) image sensor with a few millions or tens of millions of pixels. In some implementations, camera 2250 may include two or more cameras that may be used to capture 3-D images.

In some embodiments, electronic system 2200 may include a plurality of other hardware modules 2280. Each of other hardware modules 2280 may be a physical module within electronic system 2200. While each of other hardware modules 2280 may be permanently configured as a structure, some of other hardware modules 2280 may be temporarily configured to perform specific functions or temporarily activated. Examples of other hardware modules 2280 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2280 may be implemented in software.

In some embodiments, memory 2220 of electronic system 2200 may also store a virtual reality engine 2226. Virtual reality engine 2226 may execute applications within electronic system 2200 and receive position information, acceleration information, velocity information, predicted future positions, or some combination thereof of the HMD device from the various sensors. In some embodiments, the information received by virtual reality engine 2226 may be used for producing a signal (e.g., display instructions) to display module 2260. For example, if the received information indicates that the user has looked to the left, virtual reality engine 2226 may generate content for the HMD device that mirrors the user's movement in a virtual environment. Additionally, virtual reality engine 2226 may perform an action within an application in response to an action request received from user input/output module 2270 and provide feedback to the user. The provided feedback may be visual, audible, or haptic feedback. In some implementations, processor(s) 2210 may include one or more GPUs that may execute virtual reality engine 2226.

In various implementations, the above-described hardware and modules may be implemented on a single device or on multiple devices that can communicate with one another using wired or wireless connections. For example, in some implementations, some components or modules, such as GPUs, virtual reality engine 2226, and applications (e.g., tracking applications), may be implemented on a console separate from the head-mounted display device. In some implementations, one console may be connected to or support more than one HMD.

In alternative configurations, different and/or additional components may be included in electronic system 2200. Similarly, functionality of one or more of the components can be distributed among the components in a manner different from the manner described above. For example, in some embodiments, electronic system 2200 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:
1. An eye-tracking system comprising:
   a substrate transparent to visible light and configured to be placed in a field of view of an eye of a user;
   a plurality of waveguides on the substrate, the plurality of waveguides including single-mode waveguides;

a light source optically coupled to the plurality of waveguides and configured to emit coherent light; and a plurality of polarization volume holograms (PVHs) in the field of view of the eye of the user, wherein each PVH of the plurality of PVHs is optically coupled to a respective waveguide of the plurality of waveguides and is configured to couple a respective light beam out of the respective waveguide towards the eye of the user, wherein a first pair of PVHs of the plurality of PVHs are configured to couple a first pair of light beams out of a first pair of waveguides of the plurality of waveguides, wherein the first pair of light beams interfere at the eye of the user and form a first set of fringes on the eye of the user.

2. The eye-tracking system of claim 1, further comprising a polarization converter or a filter between each PVH of the plurality of PVHs and the respective waveguide of the plurality of waveguides, the polarization converter configured to convert linearly polarized light into circularly polarized light or convert circularly polarized light into linearly polarized light.

3. The eye-tracking system of claim 2, wherein the polarization converter includes a quarter-wave plate.

4. The eye-tracking system of claim 1, wherein:
a second pair of PVHs of the plurality of PVHs are configured to couple a second pair of light beams out of a second pair of waveguides of the plurality of waveguides;
the second pair of light beams interfere at the eye of the user and form a second set of fringes on the eye of the user; and
the first set of fringes and the second set of fringes have different orientations, different periods, or both.

5. The eye-tracking system of claim 1, wherein each PVH of the first pair of PVHs is characterized by two or more different grating periods.

6. The eye-tracking system of claim 1, further comprising:
a second plurality of waveguides on the substrate;
a second light source optically coupled to the second plurality of waveguides and configured to emit coherent light; and
a second plurality of PVHs in the field of view of the eye of the user, wherein each PVH of the second plurality of PVHs is optically coupled to a respective waveguide of the second plurality of waveguides and is configured to couple a respective light beam out of the respective waveguide of the second plurality of waveguides towards the eye of the user,
wherein a second pair of PVHs of the second plurality of PVHs are configured to couple a second pair of light beams out of a pair of waveguides of the second plurality of waveguides, and wherein the second pair of light beams interfere at the eye of the user and form a second set of fringes on the eye of the user, the first set of fringes and the second set of fringes having different orientations, different periods, or both.

7. The eye-tracking system of claim 1, wherein each PVH of the plurality of PVHs is characterized by a uniform grating period.

8. The eye-tracking system of claim 1, wherein light beams coupled out of the plurality of waveguides by the plurality of PVHs form a two-dimensional pattern of glints on the eye of the user.

9. The eye-tracking system of claim 1, wherein each PVH of the plurality of PVHs includes a layer of a birefringent material including helical structures formed by molecules of the birefringent material that are oriented according to a periodical pattern.

10. The eye-tracking system of claim 9, wherein a rotation plane of the molecules of the birefringent material is slanted with respect to the substrate.

11. The eye-tracking system of claim 9, wherein the helical structures form a Bragg grating, and wherein a Bragg plane of the Bragg grating is slanted with respect to the substrate.

12. The eye-tracking system of claim 1, wherein each PVH of the plurality of PVHs includes:
a transmissive PVH on the respective waveguide of the plurality of waveguides and between the respective waveguide and the eye of the user; or
a reflective PVH below the respective waveguide of the plurality of waveguides, where the respective waveguide is between the reflective PVH and the eye of the user.

13. The eye-tracking system of claim 1, wherein:
each waveguide of the plurality of waveguides includes an end section having a width greater than a width of other sections of the waveguide; and
each PVH of the plurality of PVH is on the end section of the respective waveguide of the plurality of waveguides.

14. The eye-tracking system of claim 13, wherein each waveguide of the plurality of waveguides includes a tapered section between the end section and other sections of the waveguide.

15. The eye-tracking system of claim 1, wherein a light beam coupled out of a waveguide of the plurality of waveguides by a PVH of the plurality of PVHs propagates at an angle greater than 30° with respect to a surface-normal direction of the substrate.

16. The eye-tracking system of claim 1, further comprising one or more camera configured to capture images of the eye of the user from one or more perspectives.

* * * * *